US012809926B2

(12) United States Patent
Davis et al.

(10) Patent No.: US 12,809,926 B2
(45) Date of Patent: Nov. 24, 2026

(54) GENERATING ACCUMULATING REGIONAL METRIC MAP USER INTERFACES BASED ON MOVEMENTS OF PROVIDER DEVICE THROUGH REGIONS

(71) Applicant: Lyft, Inc., San Francisco, CA (US)

(72) Inventors: Matthew Allen Davis, San Francisco, CA (US); Jiayu Gong, Fremont, CA (US); Aneesh Khera, Glendora, CA (US); Hao Yi Ong, San Francisco, CA (US); Omkar Shivanand Savant, San Francisco, CA (US); Brandon Douglas Souba, San Francisco, CA (US); Allison Misato Lee, San Francisco, CA (US)

(73) Assignee: Lyft, Inc., San Francisco, CA (US)

(*) Notice: Subject to any disclaimer, the term of this patent is extended or adjusted under 35 U.S.C. 154(b) by 0 days.

(21) Appl. No.: 17/554,530

(22) Filed: Dec. 17, 2021

(65) Prior Publication Data

US 2023/0195816 A1 Jun. 22, 2023

(51) Int. Cl.
*G06F 16/9537* (2019.01)
*G06F 16/29* (2019.01)
(Continued)

(52) U.S. Cl.
CPC .......... *G06F 16/9537* (2019.01); *G06F 16/29* (2019.01); *G06F 16/9538* (2019.01); *G06Q 50/40* (2024.01); *H04W 64/00* (2013.01)

(58) Field of Classification Search
CPC .. G06F 16/9537; G06F 16/9538; G06F 16/29; G06Q 50/40; H04W 64/00
See application file for complete search history.

(56) References Cited

U.S. PATENT DOCUMENTS 7,663,528 B1 2/2010 Malakian et al.
9,358,986 B2 6/2016 Hunt
(Continued)

FOREIGN PATENT DOCUMENTS

WO WO 2020/159431 A1 8/2020

OTHER PUBLICATIONS

Lu et al. ("Surge pricing Moves Uber's Driver-Partner"; School of Operations Research and Information Engineering, Cornell University; May 17, 2018) (Year: 2018).*
(Continued)

*Primary Examiner* — Ken Hoang
(74) *Attorney, Agent, or Firm* — Keller Preece PLLC

(57) ABSTRACT

Methods, systems, and non-transitory computer readable storage media are disclosed for generating region-based metrics for provider devices based on movement of provider devices through various regions and transportation requests within the various regions. For example, the disclosed system provides an accumulating regional metric map including one or more regions with pins indicating corresponding region-based metrics to a provider device. The disclosed system can then determine whether the provider device passes through (or otherwise enters) a region with a pin and determine the corresponding region-based metric of the region for the provider device. In response to generating a transportation match between the provider device and a requester device, the disclosed system can provide a notification of the region-based metric to the provider device in connection with the transportation match. The disclosed system can apply the region-based metric upon completion of a transportation request associated with the transportation match.

20 Claims, 12 Drawing Sheets

(51) Int. Cl.

| | |
|---|---|
| ***G06F 16/9538*** | (2019.01) |
| ***G06Q 50/40*** | (2024.01) |
| ***H04W 64/00*** | (2009.01) |

(56) References Cited

U.S. PATENT DOCUMENTS

| | | | |
|---|---|---|---|
| 9,864,778 | B1 | 1/2018 | Strand et al. |
| 10,032,181 | B1 | 7/2018 | Madhow et al. |
| 10,157,436 | B2 | 12/2018 | Samocha et al. |
| 10,552,773 | B1 | 2/2020 | Shah et al. |
| 10,706,487 | B1 | 7/2020 | Chachra et al. |
| 10,794,713 | B2 | 10/2020 | Magazinik et al. |
| 11,035,683 | B2 | 6/2021 | Marco |
| 11,514,546 | B2 | 11/2022 | Chachra et al. |
| 11,551,139 | B1 | 1/2023 | Finamore et al. |
| 11,763,411 | B1 | 9/2023 | Chachra et al. |
| 11,887,483 | B2 | 1/2024 | Bajaj et al. |
| 12,094,024 | B1 | 9/2024 | Chachra et al. |
| 2005/0015316 | A1 | 1/2005 | Salluzzo |
| 2005/0021225 | A1 | 1/2005 | Kantarjiev et al. |
| 2006/0069601 | A1 | 3/2006 | Simon et al. |
| 2008/0195428 | A1 | 8/2008 | O'Sullivan |
| 2009/0119006 | A1 | 5/2009 | Silver et al. |
| 2009/0210262 | A1 | 8/2009 | Clark et al. |
| 2009/0325556 | A1 | 12/2009 | Lee et al. |
| 2010/0268450 | A1 | 10/2010 | Stephen |
| 2011/0161116 | A1 | 6/2011 | Peak et al. |
| 2011/0184640 | A1 | 7/2011 | Coleman et al. |
| 2011/0246404 | A1 | 10/2011 | Lehmann et al. |
| 2012/0109694 | A1 | 5/2012 | Lee et al. |
| 2012/0246039 | A1 | 9/2012 | Fain et al. |
| 2012/0316763 | A1 | 12/2012 | Haynes, III et al. |
| 2013/0041708 | A1 | 2/2013 | Jackson, Jr. et al. |
| 2013/0132140 | A1 | 5/2013 | Amin et al. |
| 2013/0246207 | A1 | 9/2013 | Novak et al. |
| 2013/0253969 | A1 | 9/2013 | Das et al. |
| 2014/0129951 | A1 | 5/2014 | Amin et al. |
| 2014/0156410 | A1 | 6/2014 | Wuersch et al. |
| 2014/0172439 | A1 | 6/2014 | Conway et al. |
| 2014/0207375 | A1 | 7/2014 | Lerenc |
| 2014/0279654 | A1 | 9/2014 | Lievens et al. |
| 2014/0337123 | A1 | 11/2014 | Nuernberg et al. |
| 2014/0358435 | A1 | 12/2014 | Bell et al. |
| 2015/0039214 | A1 | 2/2015 | Mcclellan et al. |
| 2015/0046080 | A1 | 2/2015 | Wesselius et al. |
| 2015/0081399 | A1 | 3/2015 | Mitchell et al. |
| 2015/0154810 | A1 | 6/2015 | Tew et al. |
| 2015/0161554 | A1 | 6/2015 | Sweeney et al. |
| 2015/0161564 | A1 | 6/2015 | Sweeney et al. |
| 2015/0206267 | A1 | 7/2015 | Khanna et al. |
| 2015/0242772 | A1 | 8/2015 | Backof, II et al. |
| 2015/0262430 | A1 | 9/2015 | Farrelly et al. |
| 2015/0339928 | A1 | 11/2015 | Ramanujam |
| 2015/0371157 | A1 | 12/2015 | Jaffe |
| 2015/0379437 | A1 | 12/2015 | Reich |
| 2016/0026936 | A1 | 1/2016 | Richardson et al. |
| 2016/0027307 | A1 | 1/2016 | Abhyanker et al. |
| 2016/0034845 | A1 | 2/2016 | Hiyama et al. |
| 2016/0098649 | A1 | 4/2016 | Ifrach et al. |
| 2016/0117610 | A1 | 4/2016 | Ikeda et al. |
| 2016/0148164 | A1 | 5/2016 | Luk et al. |
| 2016/0171574 | A1 | 6/2016 | Paulucci et al. |
| 2016/0171882 | A1 | 6/2016 | Handley |
| 2016/0209220 | A1 | 7/2016 | Laetz |
| 2016/0320198 | A1 | 11/2016 | Liu et al. |
| 2016/0321566 | A1 | 11/2016 | Liu et al. |
| 2016/0335576 | A1 | 11/2016 | Peng |
| 2016/0364824 | A1 | 12/2016 | Bryant et al. |
| 2017/0034110 | A1 | 2/2017 | Bijor et al. |
| 2017/0061801 | A1 | 3/2017 | Huang et al. |
| 2017/0098377 | A1 | 4/2017 | Marco et al. |
| 2017/0102243 | A1 | 4/2017 | Samocha et al. |
| 2017/0124506 | A1 | 5/2017 | Khan |
| 2017/0147951 | A1 | 5/2017 | Meyer et al. |
| 2017/0154348 | A1 | 6/2017 | Biswas et al. |
| 2017/0169366 | A1 | 6/2017 | Klein et al. |
| 2017/0169377 | A1 | 6/2017 | Liu et al. |
| 2017/0169535 | A1 | 6/2017 | Tolkin et al. |
| 2017/0191842 | A1 | 7/2017 | Igor et al. |
| 2017/0227370 | A1 | 8/2017 | O'Mahony et al. |
| 2017/0262790 | A1 | 9/2017 | Khasis |
| 2017/0353536 | A1 | 12/2017 | Shraer et al. |
| 2017/0372235 | A1 | 12/2017 | Dayama et al. |
| 2018/0025407 | A1 | 1/2018 | Zhang et al. |
| 2018/0032928 | A1 | 2/2018 | Li et al. |
| 2018/0075380 | A1 | 3/2018 | Perl et al. |
| 2018/0101878 | A1 | 4/2018 | Marueli et al. |
| 2018/0121847 | A1 | 5/2018 | Zhao et al. |
| 2018/0121958 | A1 | 5/2018 | Aist et al. |
| 2018/0158322 | A1 | 6/2018 | McDonnell et al. |
| 2018/0174446 | A1 | 6/2018 | Wang |
| 2018/0190040 | A1 | 7/2018 | Batten et al. |
| 2018/0211541 | A1 | 7/2018 | Rakah et al. |
| 2018/0225796 | A1 | 8/2018 | Liu |
| 2018/0232840 | A1 | 8/2018 | Liu |
| 2019/0066251 | A1 | 2/2019 | Samocha et al. |
| 2019/0080340 | A1 | 3/2019 | Berger et al. |
| 2019/0295259 | A1* | 9/2019 | Deskevich .............. G06F 30/00 |
| 2019/0340928 | A1 | 11/2019 | Goldman et al. |
| 2020/0082313 | A1 | 3/2020 | Crapis et al. |
| 2020/0082315 | A1* | 3/2020 | Crapis .............. G06Q 10/06311 |
| 2020/0219220 | A1* | 7/2020 | Levi .................. G06Q 30/0284 |
| 2020/0250600 | A1 | 8/2020 | Gupta et al. |
| 2020/0344602 | A1 | 10/2020 | Li |
| 2021/0072035 | A1 | 3/2021 | Magazinik et al. |
| 2021/0192292 | A1 | 6/2021 | Zhai |
| 2021/0192555 | A1 | 6/2021 | Tang |
| 2022/0187084 | A1* | 6/2022 | Qin .................... G01C 21/3446 |
| 2024/0070571 | A1 | 2/2024 | Mayer et al. |

OTHER PUBLICATIONS

U.S. Appl. No. 16/944,428, Jul. 21, 2023, Office Action.
U.S. Appl. No. 16/944,428, Jul. 9, 2024, Office Action.
Ma, et al. "Spatio-temporal pricing for ridesharing platforms." Operations Research 70.2 (2022): 1025-1041. [online], [retrieved on Dec. 17, 2022]. Retrieved from the Internet <https://arxiv.orgiabs/1801.04015> (Year: 2018).
U.S. Appl. No. 16/944,428, Dec. 27, 2022, Office Action.
U.S. Appl. No. 17/063,403, Dec. 28, 2022, Office Action.
U.S. Appl. No. 17/063,403, Mar. 22, 2023, Notice of Allowance.
U.S. Appl. No. 16/539,965, Sep. 26, 2022, Office Action.
U.S. Appl. No. 16/177,085, Oct. 27, 2022, Notice of Allowance.
U.S. Appl. No. 18/048,545, Nov. 26, 2024, Notice of Allowance.
Chowdhry, Amit, Uber: Users are more likely to pay surge pricing if their phone battery is low, May 25, 2016. Forbes.com https://www.forbes.conn/sites/annitchowdhry/2016/05/25/uber-low-battery/#732fbb8074b3 (Year: 2016).
European Search Report for European Patent Application No. EP 17195935.6, mailed Dec. 11, 2017, 9 pages.
Office Action as received in European Application 17195935.6 dated Oct. 18, 2019.
Summons to attend oral proceedings as received in European Application 17195935.6 dated Jun. 16, 2020.
Office Action as received in Israeli Application 254949 dated Sep. 24, 2019.
Office Action as received in Israeli Application 254949 dated Jul. 26, 2020.
Lyft Help; "Personal Power Zones"; Date downloaded Jan. 12, 2022; https://help.lyft.com/hc/e/articles/115012926807-Personal-Power-Zones.
U.S. Appl. No. 16/125,563, Nov. 30, 2018, Office Action.
U.S. Appl. No. 16/125,563, May 1, 2019, Office Action.
U.S. Appl. No. 16/125,563, Oct. 8, 2019, Notice of Allowance.
U.S. Appl. No. 16/125,551, Aug. 14, 2020, Office Action.
U.S. Appl. No. 16/125,527, Aug. 18, 2020, Office Action.
U.S. Appl. No. 16/125,540, Aug. 19, 2020, Office Action.
U.S. Appl. No. 15/810,028, Dec. 2, 2019, Office Action.
U.S. Appl. No. 15/810,028, Apr. 30, 2019, Notice of Allowance.
U.S. Appl. No. 16/539,965, Jun. 8, 2021, Office Action.

(56) References Cited

OTHER PUBLICATIONS

U.S. Appl. No. 14/985,565, Aug. 29, 2017, Office Action.
U.S. Appl. No. 14/985,565, Feb. 21, 2018, Office Action.
U.S. Appl. No. 14/985,565, May 29, 2018, Office Action.
U.S. Appl. No. 14/985,565, Dec. 17, 2018, Office Action.
U.S. Appl. No. 14/985,565, Apr. 4, 2019, Office Action.
U.S. Appl. No. 14/985,565, Sep. 16, 2019, Office Action.
U.S. Appl. No. 14/985,565, Jun. 4, 2020, Notice of Allowance.
U.S. Appl. No. 15/290,366, Jun. 25, 2019, Office Action.
U.S. Appl. No. 15/290,366, Jan. 10, 2020, Office Action.
U.S. Appl. No. 15/290,366, May 13, 2020, Office Action.
U.S. Appl. No. 15/290,366, Oct. 27, 2020, Office Action.
U.S. Appl. No. 15/290,366, Mar. 22, 2021, Office Action.
U.S. Appl. No. 15/290,366, Jun. 29, 2021, Office Action.
U.S. Appl. No. 14/880,021, Jan. 13, 2017, Office Action.
U.S. Appl. No. 14/880,021, Jul. 11, 2017, Office Action.
U.S. Appl. No. 14/880,021, Dec. 5, 2017, Office Action.
U.S. Appl. No. 14/880,021, Apr. 17, 2018, Office Action.
U.S. Appl. No. 14/880,021, Aug. 23, 2018, Notice of Allowance.
U.S. Appl. No. 16/177,085, Nov. 5, 2020, Office Action.
U.S. Appl. No. 16/177,085, Mar. 25, 2021, Office Action.
U.S. Appl. No. 16/177,085, Jul. 18, 2022, Office Action.
U.S. Appl. No. 16/780,712, Jun. 24, 2022, Notice of Allowance.
U.S. Appl. No. 16/921,698, Jul. 26, 2022, Notice of Allowance.
U.S. Appl. No. 16/539,965, Oct. 26, 2023, Office Action.
U.S. Appl. No. 16/944,428, Dec. 13, 2023, Office Action.
U.S. Appl. No. 18/469,127, Apr. 11, 2024, Office Action.
U.S. Appl. No. 18/469,127, May 15, 2024, Notice of Allowance.
U.S. Appl. No. 18/048,545, Jul. 2, 2024, Office Action.
Alexander et al., Origin-destination trips by purpose and time of day inferred from mobile phone data, 2015, Elsevier, Transportation Research Part C 58, pp. 240-250 (Year: 2015).
U.S. Appl. No. 16/539,965, Apr. 21, 2023, Office Action.
U.S. Appl. No. 18/059,071, Mar. 30, 2023, Office Action.
U.S. Appl. No. 18/059,071, May 2, 2023, Notice of Allowance.
U.S. Appl. No. 16/177,085, Feb. 18, 2022, Office Action.
U.S. Appl. No. 16/780,712, Mar. 25, 2022, Office Action.
U.S. Appl. No. 16/921,698, Mar. 31, 2022, Office Action.
U.S. Appl. No. 16/944,428, May 28, 2025, Notice of Allowance.
U.S. Appl. No. 18/356,101, Jul. 3, 2025, Office Action.
U.S. Appl. No. 18/829,595, Feb. 23, 2026, Office Action.
U.S. Appl. No. 18/356,101, Jan. 28, 2026, Office Action.
U.S. Appl. No. 18/829,595, Jul. 15, 2026, Notice of Allowance.
U.S. Appl. No. 19/081,922, May 19, 2026, Office Action.
U.S. Appl. No. 18/356,101, Jun. 22, 2026, Office Action.

* cited by examiner

GENERATING ACCUMULATING REGIONAL METRIC MAP USER INTERFACES BASED ON MOVEMENTS OF PROVIDER DEVICE THROUGH REGIONS

BACKGROUND

In recent years, transportation matching systems have introduced significant technological improvements in mobile app-based matching of transportation providers and requesters. Indeed, the proliferation of web and mobile applications enable requesting computer devices to submit transportation requests via on-demand transportation matching systems. On-demand transportation matching systems can identify available provider computing devices that can provide transportation services from one geographic location to another and identify digital matches between provider computing devices and requester computing devices. Although conventional transportation matching systems can match requesting computing devices with provider computing devices, conventional systems often face a number of technical problems, particularly with respect to flexibility of operation and efficiency of implementing computing devices.

SUMMARY

One or more embodiments provide benefits and/or solve one or more of the foregoing or other problems in the art with systems, methods, and non-transitory computer readable storage media that generate region-based metrics for provider devices based on movement of provider devices through various regions and transportation requests within the various regions. In particular, the disclosed systems can improve network coverage and computing efficiency by providing an accumulating regional metric map including one or more regions with pins indicating one or more region-based metrics to a provider device. The disclosed systems can then determine whether the provider device passes through (or otherwise enters) a region with a pin and determine the corresponding region-based metric of the region for the provider device. Furthermore, in response to generating a transportation match between the provider device and a requester device, the disclosed systems can provide a notification of the region-based metric to the provider device in connection with the transportation match. The disclosed systems can utilize the region-based metrics to improve throughput, network coverage, and computational resources of a transportation matching system.

BRIEF DESCRIPTION OF THE DRAWINGS

The detailed description refers to the drawings briefly described below.

DETAILED DESCRIPTION

Figure 1:
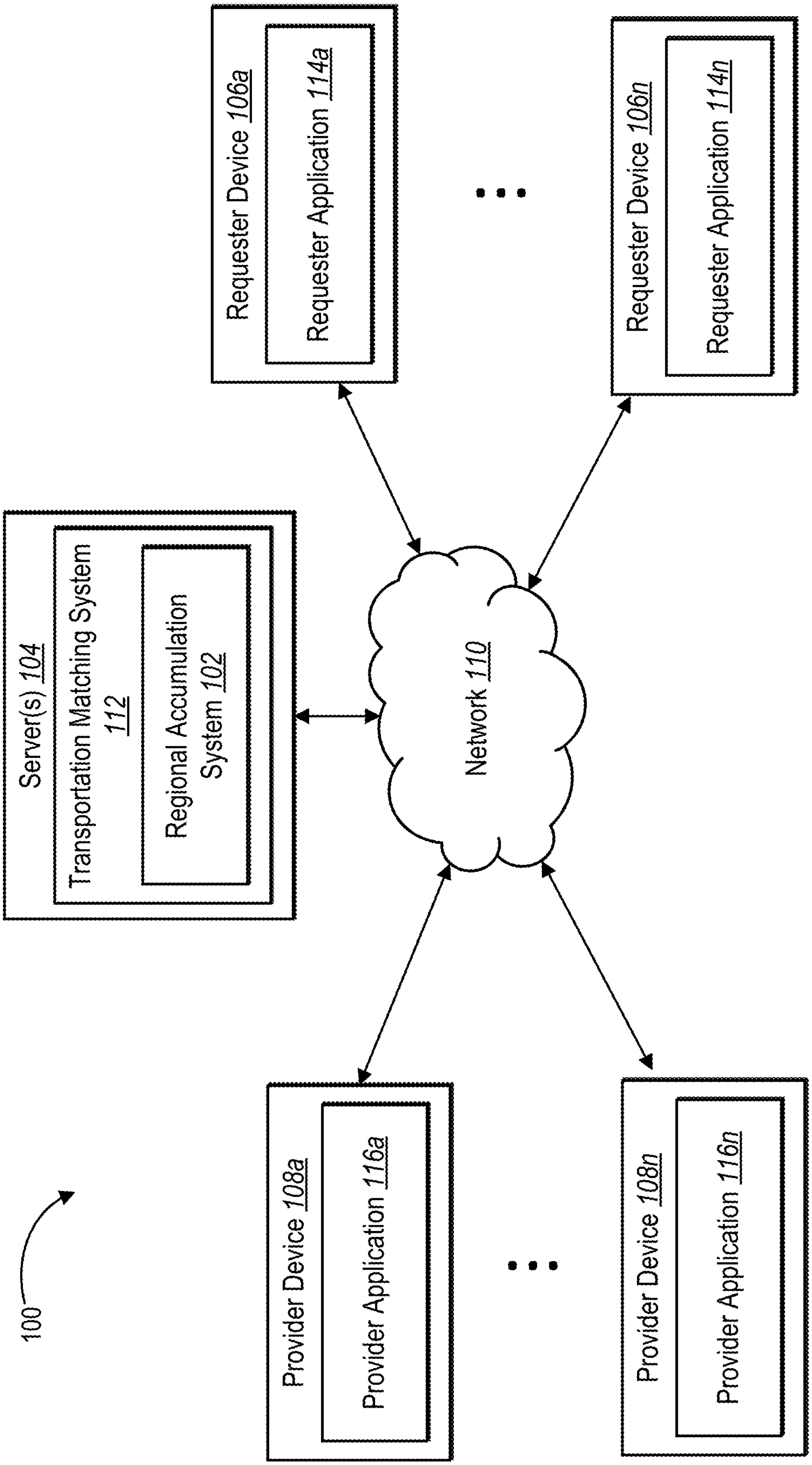
FIG. 1 illustrates a block diagram of an environment for implementing a regional accumulation system in accordance with one or more embodiments.

This disclosure describes one or more embodiments of a regional accumulation system that determines accumulating regional metrics for provider devices based on movement of the provider devices relative to an accumulating regional metric map. In particular, the regional accumulation system determines values and placement of accumulating metric pins within an accumulating regional metric map including a plurality of regions in connection with a transportation matching system. For example, as the number of unmatched transportation requests within various regions or sub-regions increases, the regional accumulation system utilizes cumulative events metrics within regional (or sub-regional) repositories to manage network coverage and provider device utilization.

To illustrate, the regional accumulation system can determine an accumulating regional metric for a particular provider device when the provider device moves through a region to another region based on the cumulative events metrics. The regional accumulation system can then generate a notification of the accumulating regional metric to provide to the provider device in connection with a transportation match involving the provider device, even when the provider device is offline or otherwise unavailable (e.g., not currently servicing transportation requests). By leveraging information about provider/requester device imbalances across a plurality of regions to provide notifications to provider devices, the regional accumulation system can more efficiently utilize available or unavailable provider devices, increase network coverage, improve throughput, and reduce computational resources.

In one or more embodiments, the regional accumulation system provides an accumulating regional metric map for display at a provider device. For instance, the regional accumulation system is part of a transportation matching system that matches transportation requests from transportation requester devices to transportation provider devices in one or more regions or sub-regions. In one or more embodiments, in connection with generating transportation matches for requests, the regional accumulation system provides a map of the region(s) to a provider device. To illustrate, the regional accumulation system provides the accumulating regional metric map including a plurality of accumulating metric pins according to region-based data for one or more regions (or sub-regions).

According to one or more embodiments, the regional accumulation system determines a plurality of cumulative events metrics for a plurality of regions based on transportation requests in the plurality of regions. Specifically, the regional accumulation system determines a number of requests located within each region (e.g., within each geocoded area) and/or transportation values associated with the requests. The regional accumulation system then determines the cumulative events metrics for the regions based on the number of requests and/or the transportation values of the requests within each region. The regional accumulation system also determines the accumulating metric pins according to the cumulative events metrics.

In one or more additional embodiments, the regional accumulation system determines an accumulating regional metric for a provider device based on movement of the provider device. For example, the regional accumulation system monitors movement of the provider device to a first region associated with an accumulating metric pin in the accumulating regional metric map. The regional accumulation system then determines an accumulating regional metric for the provider device based on the accumulating metric pin of the first region. In some embodiments, the regional accumulation system determines the accumulating regional metric for the provider device according to transportation requests in neighboring regions that are expected to convert (e.g., match with other provider devices).

Furthermore, the regional accumulation system provides a notification of the accumulating regional metric to the provider device in connection with a transportation request. In particular, the regional accumulation system can generate a transportation match for the provider device to a transportation request within a second region different from the first region. In connection with the transportation match, the regional accumulation system can provide a transportation match notification that includes the accumulating regional metric. To illustrate, the regional accumulation system can apply the accumulating regional metric to the transportation request upon the provider device fulfilling the transportation request.

As mentioned, although conventional transportation matching systems can match requesting computing devices with provider computing devices, conventional systems often face a number of technical problems, particularly with respect to flexibility of operation and efficiency of implementing computing devices. In particular, conventional transportation matching systems provide user interfaces that illustrate personalized transportation incentive values for small regional areas to encourage repositioning of online provider devices. This approach, however, is often inefficient because it requires individualized determinations for particular provider devices. Indeed, this approach can require significant computational resources to generate individual user interfaces and corresponding values across hundreds or thousands of provider devices.

Moreover, conventional systems are often rigid and inflexible in responding to provider device imbalances. For instance, many conventional systems can utilize user interfaces to reposition provider devices through incentive repositioning elements but fail to address provider device imbalances where the number of requester devices outpaces provider devices. As outlined in greater detail below, such imbalances can result in significant system inefficiencies and the inflexibility of conventional approaches cannot address such circumstances other than to reposition existing provider devices in particular locations.

As just mentioned, conventional transportation matching systems often operate inefficiently in matching provider devices and requester devices. In particular, conventional systems often inefficiently utilize time, communication, and computing resources when matching provider vehicles with requesters. These inefficiencies are exacerbated by poor network coverage resulting from device imbalances, such as a shortfall in provider devices relative to the number of requestor devices. For instance, many conventional transportation matching systems generate inefficient matches that require significant time for provider devices to travel to requester devices and significant time for servers, provider devices, and requester devices to operate in managing a transportation match. This additional waiting time translates to additional and excessive network bandwidth and utilization of computational resources. Indeed, each additional minute of inefficient time translates to multiple different queries from requester devices (e.g., updates regarding provider device locations, duplicate digital transportation requests, queries regarding other transportation options, etc.), and provider devices (e.g., navigational queries, queries regarding alternative pick-up options, etc.).

Moreover, excessive travel/waiting time often results in additional digital cancellations, which leads to duplicate network traffic and computational processing (e.g., additional requests from requester devices, communication with provider devices, and server resources in identifying duplicate matches and coordinating transportation services). To illustrate, due at least in part to the inflexibility of the conventional systems, the conventional systems are also unable to efficiently handle imbalances in network coverage for a given area. These imbalances result in matches with long wait times that inefficiently dispatch provider devices, which further results in letting other transportation requests lapse due to long wait times without matching the requests.

The regional accumulation system provides several technical benefits relative to conventional systems. For example, the regional accumulation system can improve the flexibility of operation relative to conventional systems. In particular, the regional accumulation system utilizes a flexible computational model that generates accurate accumulating regional metrics for provider devices and provides accumulating regional metric maps across large regions applicable to a large population of online and offline provider devices. Rather than generating individualized small-region incentive values, the regional accumulation system can generate accumulating regional metric maps that are applicable across a population of provider devices, thus significantly reducing computational resources and bandwidth.

In addition, rather than focusing on repositioning of existing provider devices, the regional accumulation system can improve device imbalances by increasing the provider device pool in areas with excessive requester device numbers relative to the number of provider devices. Indeed, the regional accumulation system can provide an accumulating regional metric map to online and offline drivers. The accumulation regional metric map can include accumulating metric pins that reflect accumulating regional metrics that provider devices can attain by traveling to or through a corresponding region. Thus, even when transportation requests originate outside of a particular region, the regional accumulation system can apply accumulating regional metrics to provider devices, which results in increased provider device coverage within the network. Indeed, provider devices that are offline increase coverage by coming online to attain and achieve accumulating regional metrics and online provider devices continue providing coverage to complete accumulating regional metrics that they have attained. Accordingly, rather than focusing on repositioning, the regional accumulation system identifies device imbalances and generates an accumulating regional metric map that focuses on addressing the underlying device imbalances.

As just mentioned, the regional accumulation system, in connection with a transportation matching system, integrates location data (e.g., GPS signals from GPS devices) of provider devices and requester devices into a single computational model. The computational model provides provider device allocations that are adaptable to changing device-request balances for improved network coverage of the computing systems implementing the transportation matching system.

Additionally, the regional accumulation system also improves the efficiency of computing systems implementing a transportation matching system. Specifically, the regional accumulation system provides accumulating regional metric maps even when provider devices are offline (e.g., not waiting for transportation requests or servicing transportation requests). In particular, by providing accurate accumulating regional metric maps for display at provider devices that are offline, the regional accumulation system can address underlying device imbalances in addition to locating those provider devices to areas of greater network coverage. The regional accumulation system thus improves the network coverage across a plurality of areas, which reduces computing inefficiencies resulting from unnecessary travel time, unexpected wait times, and request submissions and processing. Specifically, improved network coverage significantly reduces the number of digital rejections/cancellations from requester devices and provider devices, which further reduces the numbers of queries, status update requests, and other digital communication that strain network bandwidth and processing resources. In addition, by reducing cancellations, the regional accumulation system can further improve utilization of computational resources required to determine transportation matches by avoiding duplicate and unnecessary computer matching processes.

Turning now to the figures, FIG. 1 illustrates a schematic diagram of a system environment 100 in which a regional accumulation system 102 is implemented. In particular, the system environment 100 includes server(s) 104, requester devices 106*a*-106*n*, and provider devices 108*a*-108*n* in communication via a network 110. Moreover, as shown, the server(s) 104 include a transportation matching system 112, which includes the regional accumulation system 102. As further illustrated in FIG. 1, the requester devices 106*a*-106*n* include requester applications 114*a*-114*n*, and the provider devices 108*a*-108*n* include provider applications 116*a*-116*n*.

As shown in FIG. 1, in one or more implementations, the server(s) 104 include or hosts the transportation matching system 112. Specifically, the transportation matching system 112 includes, or is part of, one or more systems that implement matching transportation requests for providing transportation services. For example, the transportation matching system 112 communicates with the requester devices 106*a*-106*n* to receive transportation requests for providing transportation services to requesters (e.g., users) associated with the requester devices 106*a*-106*n*. For example, the requesters utilize the requester applications 114*a*-114*n* of the requester devices 106*a*-106*n* to provide the transportation requests to the transportation matching system 112 via the network 110. In some embodiments, the server(s) 104 send data to and receive data from the requester devices 106*a*-106*n* associated with transportation services and for displaying information associated with the services via the requester applications 114*a*-114*n*.

In addition to communicating with requester devices 106*a*-106*n*, the transportation matching system 112 also communicates with the provider devices 108*a*-108*n* in connection with transportation requests. Specifically, the transportation matching system 112 generates transportation matches for transportation requests by assigning specific provider devices to the transportation requests based on a variety of match criteria. To illustrate, the transportation matching system 112 utilizes location data, availability (e.g., whether a provider device is available for transportation requests), and other data associated with provider devices and/or of a region in which the transportation requests are located to assign provider devices to transportation requests. The transportation matching system 112 then communicates with the provider devices 108*a*-108*n* to send data associated with the transportation matches to the provider devices 108*a*-108*n* (e.g., for display within the provider applications 116*a*-116*n*). In one or more embodiments, the transportation matching system 112 also provides information associated with transportation requests (e.g., pick-up location, destination location, requester information, transportation value, estimated duration, estimated time of arrival).

Furthermore, as illustrated in FIG. 1, the transportation matching system 112 includes the regional accumulation system 102. In one or more embodiments, the transportation matching system 112 utilizes the regional accumulation system 102 to generate accumulating regional metric maps to provide to provider devices. Based on movements of the provider devices through regions associated with accumulating metric pins in the accumulating regional metric maps, the regional accumulation system also provides transportation match notifications indicating the accumulating regional metrics to the provider devices in connection with transportation matches involving the provider devices. Accordingly, the transportation matching system 112 utilizes the regional accumulation system 102 to balance network coverage by repositioning provider devices across a plurality of regions and incentivizing offline provider devices to go online.

As illustrated in FIG. 1, the system environment 100 includes the requester devices 106*a*-106*n* and the provider devices 108*a*-108*n*. As used herein, the term "requester device" or "transportation requester device" refers to a computing device associated with (or used by) a requester. In some embodiments, a requester device includes a requester application comprising instructions that (upon execution) cause the requester device to perform various actions for a dynamic transportation matching system. In one or more embodiments, a requester application includes a web browser, applet, or other software application (e.g., native application) available to the requester device.

Additionally, as used herein, the term "provider device" or "transportation provider device" refers to a computing device associated (or used by) a provider or a transportation vehicle. In some embodiments, a provider device includes a provider application comprising instructions that (upon execution) cause the provider device to perform various actions for a transportation matching system. A provider device can include a mobile computing device (e.g., a smartphone) or a computing device installed (or otherwise integrated) into a transportation vehicle for displaying information associated with a provider user and/or transportation requests. Such instructions may likewise cause a provider device to present a graphical user interface identifying one or more premium metrics for one or more target geocoded areas (e.g., within a heatmap). A provider device can also include functionality for indicating to the transportation matching system 112 that the provider device is online or offline.

As used herein, the term "transportation request" refers to a request from a requesting device (i.e., a requester device) for transport by a transportation vehicle. In particular, a transportation request includes a request for a transportation vehicle to transport a requester or a group of individuals from one geographic area to another geographic area. A transportation request can include information such as a pick-up location, a destination location (e.g., a location to which the requester wishes to travel), a request location (e.g., a location from which the transportation request is initiated), location profile information, a requester rating, or a travel history. As an example of such information, a transportation request may include an address as a destination location and the requester's current location as the pick-up location. A transportation request can also include a requester device initiating a session via a transportation matching application and transmitting a current location (thus, indicating a desire to receive transportation services from the current location).

Although not illustrated in FIG. 1, in some embodiments, the system environment 100 may have a different arrangement of components and/or may have a different number or set of components altogether. In certain implementations, for instance, some or all of the transportation vehicles (associated with corresponding provider devices) do not include a human provider, but constitute autonomous transportation vehicles—that is, a self-driving vehicle that includes computer components and accompanying sensors for driving without manual-provider input from a human operator. As a further example, in some embodiments, one or more of the transportation vehicles include a hybrid self-driving vehicle with both self-driving functionality and some human operator interaction.

When a transportation vehicle is an autonomous vehicle or a hybrid self-driving vehicle, the transportation vehicle may include additional components not depicted in FIG. 1. Such components may include location components, one or more sensors by which the autonomous vehicle navigates, and/or other components necessary to navigate without a provider (or with minimal interactions with a provider). Regardless of whether a transportation vehicle is associated with a provider, a transportation vehicle optionally includes a locator device, such as a GPS device, that determines the location of the transportation vehicle within the transportation vehicles.

As mentioned above, the provider devices **108*a*-108*n* may be separate or integral to transportation vehicles. Additionally, or alternatively, a provider device may be a subcomponent of a vehicle computing system. Regardless of its form, the provider devices 108*a*-108*n* may include various sensors, such as a GPS locator, an inertial measurement unit, an accelerometer, a gyroscope, a magnetometer, and/or other sensors, from which the transportation matching system 112** can access information, such as location information.

As previously mentioned, the regional accumulation system 102 can provide accumulating regional metric maps to provider devices. Specifically, the regional accumulation system 102 can provide the region-based information to provider devices to incentivize transportation vehicles to reposition to specific areas. For example, FIG. 2 illustrates a diagram of an overview of the regional accumulation system 102 providing a transportation match notification based on movement of a provider device 202 according to an accumulating regional metric map provided to the provider device.

Figure 2:
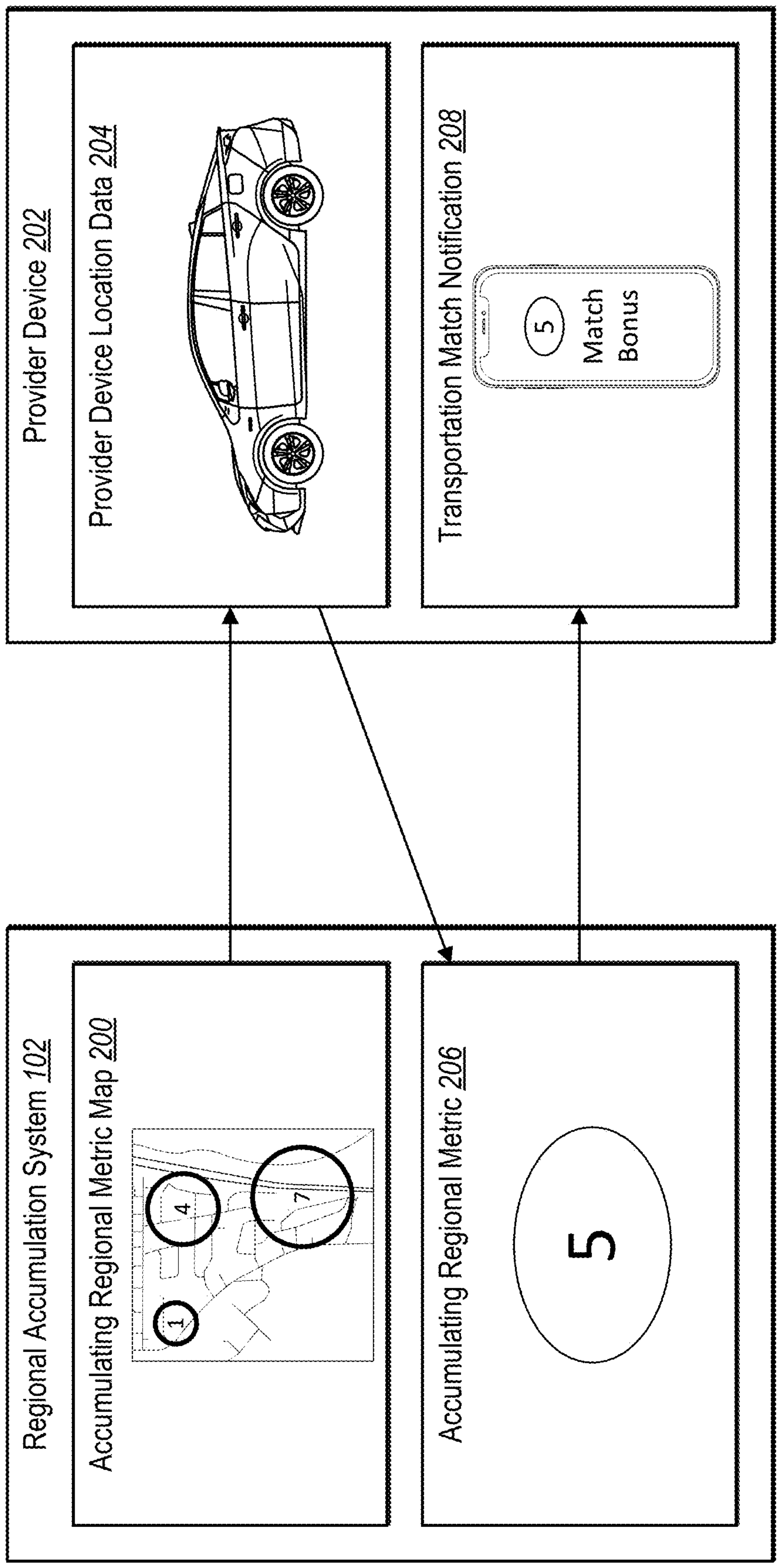
FIG. 2 illustrates a schematic diagram of an overview of the regional accumulation system providing notifications to provider devices according to an accumulating regional metric map in accordance with one or more embodiments.

In one or more embodiments, as illustrated in FIG. 2, the regional accumulation system 102 generates an accumulating regional metric map. As used herein, the term "accumulating regional metric map" refers to a digital map including transportation services data for a geographical area including one or more region-based metrics for one or more regions in the geographical area. In particular, an accumulating regional metric map can portray accumulating regional values that a provider device can attain by traveling to (or through) particular regions. For example, the accumulating regional metric map 200 includes a digital map of roads, locations, or other geographic information for a transportation provider to use in navigating within the geographical area and servicing transportation requests. Additionally, the accumulating regional metric map 200 includes accumulation regional values (e.g., region-based data related to supply-demand balances of provider devices and transportation requests) within one or more regions. To illustrate, as described in more detail below with respect to FIG. 5A-5C, the accumulating regional metric map 200 includes accumulating metric pins indicating specific incentive values associated with one or more regions.

As illustrated in FIG. 2, the regional accumulation system 102 provides the accumulating regional metric map 200 for display at a provider device 202. In connection with providing the accumulating regional metric map 200 to the provider device 202 (including managing the provider device 202 for a transportation matching system), the regional accumulation system obtains provider device location data 204 from the provider device 202. Accordingly, as described further with respect to FIG. 3A, the regional accumulation system 102 utilizes the provider device location data 204 to monitor the movement of the provider device 202 within the geographical area of the accumulating regional metric map 200.

FIG. 2 also illustrates that the regional accumulation system 102 utilizes the provider device location data 204 to determine an accumulating regional metric 206 for the provider device 202. To illustrate, as described in more detail with respect to FIG. 3A, the regional accumulation system 102 utilizes the provider device location data 204 to track the movements of the provider device 202 through one or more regions of the geographical area to one or more other regions. The regional accumulation system 102 can then determine the accumulating regional metric 206 based on the provider device 202 passing through a given region.

Figure 5B:
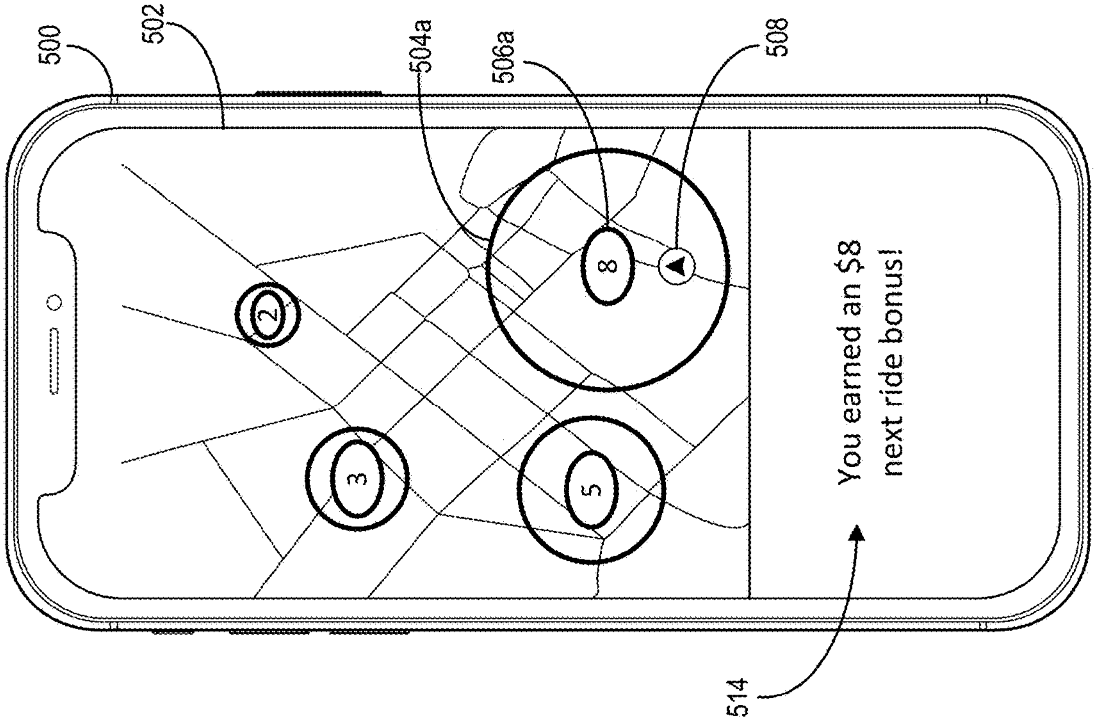
FIGS. 5A-5C illustrate graphical user interfaces of a transportation provider presenting an accumulating regional metric map in accordance with one or more embodiments.
Figure 5A:
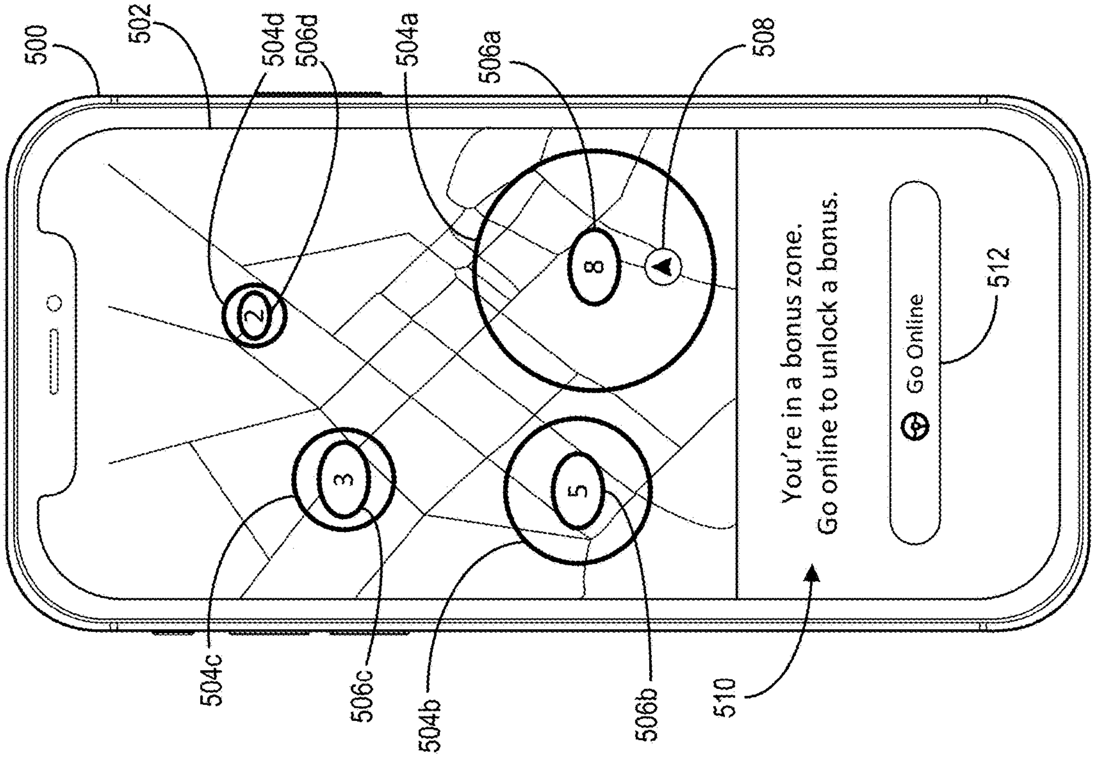
Figure 5C:
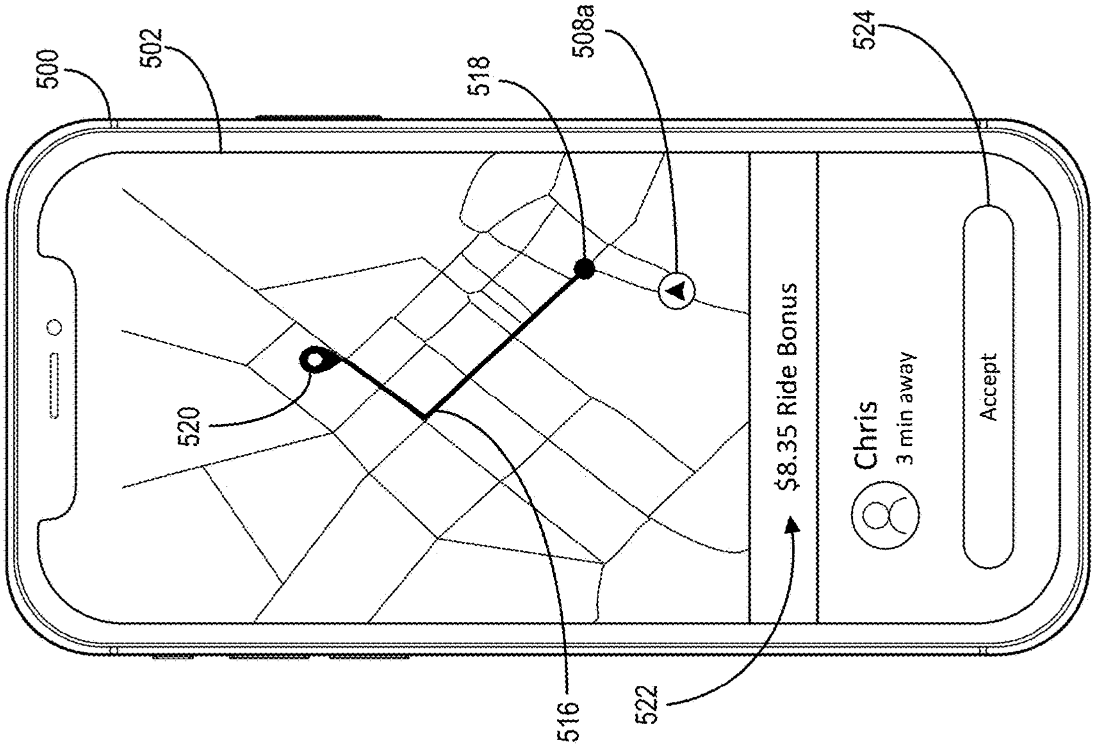

FIG. 2 further illustrates that the regional accumulation system 102 provides a transportation match notification 208 to the provider device 202. In particular, the regional accumulation system 102 generates the transportation match notification 208 to include information associated with the accumulating regional metric 206 to the provider device in connection with a transportation request. For example, after matching the provider device 202 to a transportation request, the regional accumulation system 102 can provide the transportation match notification 208 to the provider device 202. FIGS. 5A-5C illustrate additional detail associated with providing a transportation match notification to a provider device.

Figure 3A:
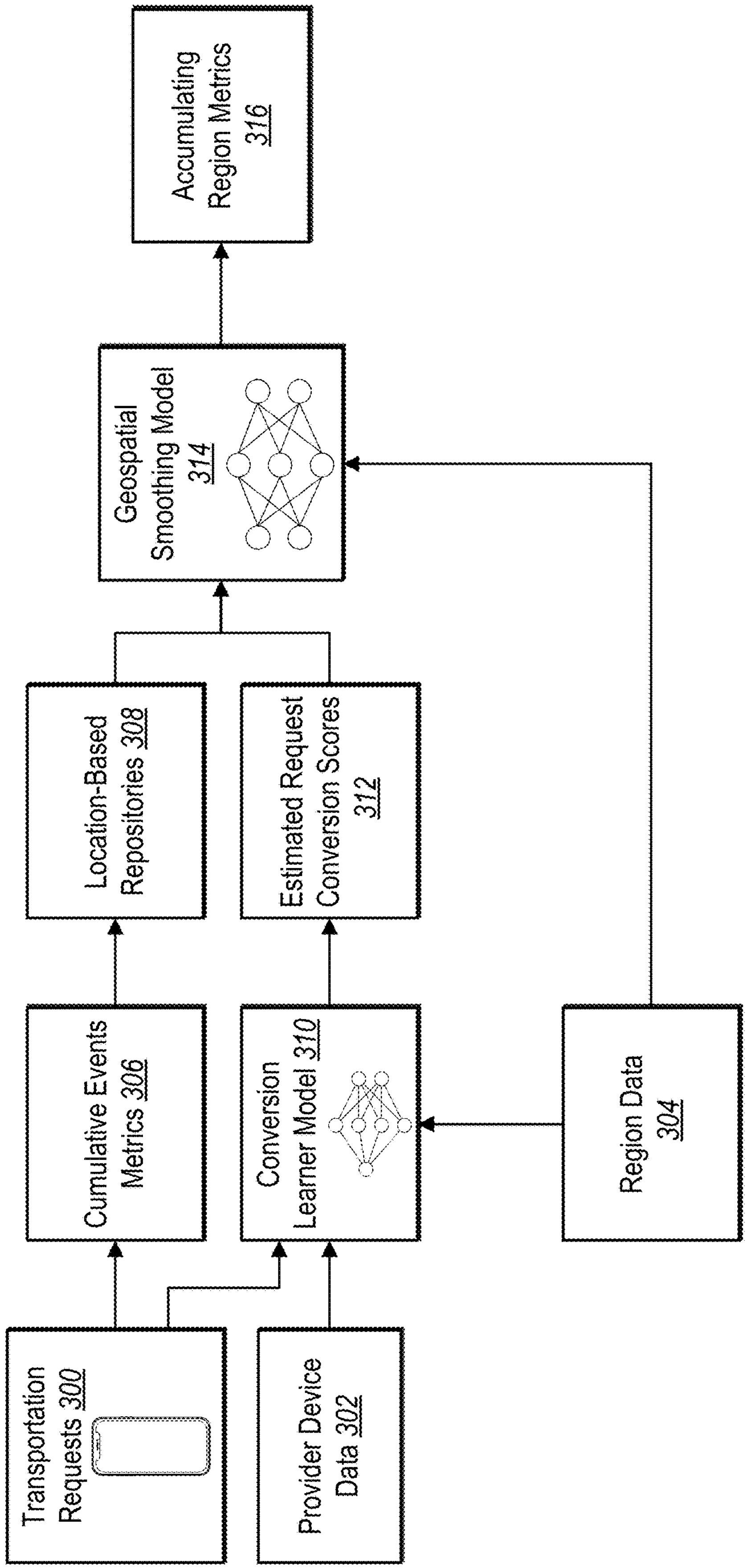
FIG. 3A illustrates a schematic diagram of the regional accumulation system generating accumulating regional metrics for provider devices based on transportation requests and provider device data in accordance with one or more embodiments.
Figure 3B:
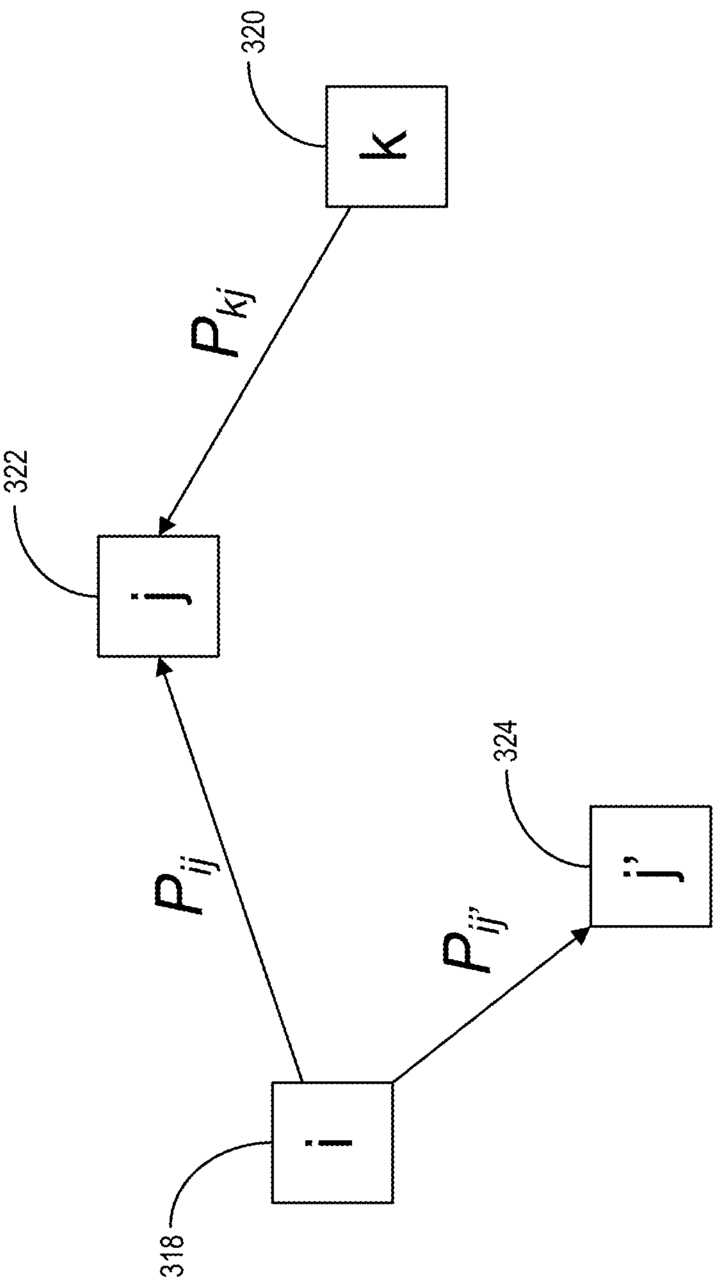
FIG. 3B illustrates a diagram indicating allocation contributions across regions in accordance with one or more embodiments.

As mentioned, the regional accumulation system 102 provides an accumulating regional metric map to a provider device including a plurality of accumulating metric pins marking high demand areas. FIGS. 3A-3B provide additional detail with respect to determining accumulating regional metrics for provider devices in connection with provider devices and transportation requests for a plurality of regions. Specifically, FIG. 3A illustrates an embodiment in which the regional accumulation system 102 utilizes transportation services data to determine accumulating regional metrics for provider devices moving within a geographical area. FIG. 3B illustrates the regional accumulation system 102 determining accumulating regional metric contributions of a plurality of transportation requests for a plurality of regions.

As mentioned, FIG. 3A illustrates a diagram of a process in which the regional accumulation system 102 generates accumulating regional metrics for provider devices. Specifically, the regional accumulation system 102 determines a plurality of transportation requests 300 within a plurality of regions. As used herein, the term "region" refers to a spatial division or unit of a geographic space. For instance, in some embodiments, a region refers to a city, a collection of cities, or a portion of a city. Such regions may include, for example, Chinatown of San Francisco, Calif.; San Francisco, Calif.; or one or more of the Boroughs of New York City, N.Y. Accordingly, the regional accumulation system 102 can determine a number and location of each of the transportation requests 300 within each separate region.

In one or more embodiments, a region includes a collection of sub-regions and/or geocoded areas (i.e., "geohashes"). Specifically, a geocoded area or geohash refers to a spatial subdivision or subunit of a sub-region or a larger geographic space. A geocoded area may be a subdivision of a geographic neighborhood as well as a subdivision of a city. As a subdivision, a geocoded area may include a segment of a street, a street, a set of bordering streets, a city block, a set of city blocks, or another portion of an area within a larger geographic space. For example, a set of bordering streets may define a geocoded area within a larger space, such as a set of streets around Times Square in New York City, N.Y. In certain embodiments, a geocoded area represents a geographic hash in a grid (or other polygon shape) of geohashes within a larger geographic space. Regardless of the form of a geocoded area, one or more requesters and corresponding requester devices or providers and corresponding provider devices may be located within a geocoded area.

According to one or more embodiments, the regional accumulation system 102 also determines provider device data 302 associated with a plurality of provider devices within the plurality of regions. For example, the regional accumulation system 102 obtains location data from GPS sensors or other location sensors of the provider devices. To illustrate, as provider devices (e.g., transportation vehicles) travel and move within and across one or more regions, the regional accumulation system 102 can track the locations of the provider devices. In particular, the regional accumulation system 102 can monitor movement of provider devices engaged in fulfilling transportation requests (e.g., traveling to a request location or transporting a requester from a pick-up location to a destination location). The regional accumulation system 102 can also monitor movement of provider devices waiting for transportation requests and/or provider devices that are unavailable for fulfilling requests.

In one or more embodiments, the provider device data 302 includes information about an availability of provider devices. Specifically, the provider device data 302 can include an indicator of an availability status of each provider device. For instance, the regional accumulation system 102 can determine whether each provider device has a "P0" status (i.e., offline, not servicing transportation requests, and/or not waiting for transportation requests), a "P1" status (i.e., online and waiting for transportation requests), a "P2" status (i.e., traveling to a pick-up location of a transportation request), or a "P3" status (i.e., transporting a requester from a pick-up location to a destination location). Accordingly, the regional accumulation system 102 can determine whether each provider device is offline or online in addition to a location of the provider device.

As illustrated in FIG. 3A, the regional accumulation system 102 determines region data 304 for a plurality of regions. In one or more embodiments, the region data 304 for a given region includes data indicating characteristics of the region in connection with transportation services within the region. For example, as illustrated, the region data 304 includes a region identifier associated with the region. Additionally, the region data 304 can include specific details associated with the region that may affect the number of transportation requests at a given time such as, but not limited to, population, events, demographics of people in the region, entities within the region (e.g., businesses or frequently traveled locations), traffic data, tourism data, device balance information (e.g., relative numbers of requester devices and provider devices), and previous transportation requests (e.g., completed requests, canceled requests). The region data 304 can also include data based on, or otherwise associated with, the provider device data 302 or the transportation requests 300, such as historical averages, seasonal data, etc.

As illustrated in FIG. 3A, in one or more embodiments, the regional accumulation system 102 determines cumulative events metrics 306 based on the transportation requests 300. As used herein, the term "cumulative events metric" refers to a numeric representation of a cumulation of transportation value or network coverage resulting from transportation events occurring within a particular geocoded area. To illustrate, the regional accumulation system 102 can increment a value of a cumulative events metric (e.g., an escrow value) for a geocoded area representing a portion of the transportation value for completing one or more steps of a transportation request based on one or more of acceptance of a transportation request, a pick-up event, an in-transit request, or a drop-off event within or through the geocoded area. Thus, for example, a region with a large number of transportation requests at a high transportation value can build up a large cumulative events metric, indicating a large amount available to provide in accumulating metric values for provider devices.

A cumulative events metric can also be based on an unrealized amount of a yet-to-be-completed transport or a realized amount of a completed transport. The regional accumulation system 102 can thus increment the value of the cumulative events metric as transportation events occur for a particular transportation request. Additionally, a cumulative-events metric can be further based on a predicted request metric (e.g., an anticipated net income) for a transportation request in the geocoded area. Accordingly, each geocoded area can be associated with a cumulative events metric, with each cumulative events metric being representative (directly or indirectly) of a number of transportation events occurring relative to a specific geocoded area for a period of time. In some embodiments, a cumulative events metric is further based on transportation requests predicted to occur within a period of time.

In additional embodiments, the regional accumulation system 102 determines the cumulative events metrics 306 for regions. For example, the regional accumulation system 102 can determine a number of transportation events occurring for the transportation requests 300 within a plurality of related geocoded areas. To illustrate, the regional accumulation system 102 can determine cumulative events metrics for a region based on the cumulative events metrics of geocoded areas within the region.

According to at least some embodiments, as illustrated in FIG. 3A, the regional accumulation system 102 stores the cumulative events metrics for geocoded areas and/or regions in location-based repositories 308. In particular, the regional accumulation system 102 stores the cumulative events metrics for a geocoded area in a geocode-specific repository. Additionally, if applicable, the regional accumulation system 102 stores the cumulative events metrics for a region in a region-specific repository. To illustrate, the regional accumulation system 102 stores a separate cumulative events metric for a regional repository for balancing cumulative events metrics across geocode-specific repositories for geocoded areas within the corresponding region.

As further illustrated in FIG. 3A, the regional accumulation system 102 utilizes a conversion learner model 310 to generate estimated request conversion scores 312 for the transportation requests 300 within the plurality of regions. In one or more embodiments, the regional accumulation system 102 utilizes the conversion learner model 310 to estimate the number of transportation requests that will convert in a period of time for a particular region. For example, the conversion learner model 310 includes a monotonically decreasing function that generates, for each transportation request (received and/or forecasted), a probability that the transportation request converts (e.g., a probability of a transportation request being accepted and/or completed by a provider device) within a particular time period.

As used herein, the term "estimated request conversion score" refers to a conversion probability for a transportation request given a particular transportation value for the transportation request. To illustrate, the regional accumulation system 102 utilizes the conversion learner model 310 to generate a plurality of different conversion probabilities (e.g., forecasted) for a single transportation request relative to a plurality of different price points. Accordingly, in one or more embodiments, the regional accumulation system 102 utilizes the conversion learner model 310 to generate the estimated request conversion scores 312 for the transportation requests 300 according to a plurality of different transportation values.

In one or more embodiments, the regional accumulation system 102 leverages the provider device data 302 and the region data 304 to generate the estimated request conversion scores 312 for the transportation requests 300. For instance, the regional accumulation system 102 can estimate the conversion probability for a transportation request within a time period based on a ratio of provider devices to transportation requests within a region or geocoded area of the transportation request. Additionally, the regional accumulation system 102 can utilize historical conversion rates associated with the region or geocoded area to determine the conversion probability given the current balance of provider devices and transportation requests. The regional accumulation system 102 can further utilize information about time of day, seasonality, regional events, demographics, and other data associated with a region or geocoded area to generate the estimated request conversion scores 312.

For example, if a first transportation request is located in a region with low historical rates of conversion, the conversion learner model 310 may return a low estimated request conversion score for the first transportation request at a first price point. Lowering the price point by a certain amount may cause the conversion learner model 310 to generate a higher estimated conversion score for the first transportation request. Additionally, for a second transportation request occurring in a different region with higher historical rates of conversion and a similar provider device-request ratio, the conversion learner model 310 may generate a higher estimated request conversion score at the first price point than the estimated request conversion score for the first transportation request.

In one or more embodiments, the regional accumulation system 102 utilizes the estimated request conversion scores 312 to determine target distributions to provider devices based on the cumulative events metrics 306 in the location-based repositories 308. For example, as illustrated in FIG. 3A, the regional accumulation system 102 utilizes a geospatial smoothing model 314 to determine a contribution of each location-based repository (e.g., a proportion of the cumulative events metric stored in the location-based repository) for generating accumulating regional metrics 316 for one or more regions. In particular, the regional accumulation system 102 can utilize the geospatial smoothing model 314 to determine an importance of each transportation request in a geocoded area expected to convert (e.g., based on the estimated request conversion scores 312) relative to other transportation requests in neighboring geocoded areas.

The regional accumulation system 102 then generates the accumulating regional metrics 316 for a plurality of geocoded areas in a region. Specifically, as used herein, the term "accumulating regional metric" refers to an added transportation value that attaches to provider devices moving through a geographical area during a particular time period. For example, an accumulating regional metric can include a numerical value representing a bonus value, premium, or reward associated with a geocoded area or region for a time period. Additionally, an accumulating regional metric can be based on a balance of provider devices and transportation requests within the geocoded area and/or region for the time period. In connection with the cumulative events metrics 306 in the location-based repositories 308, the regional accumulation system 102 thus determines the accumulating regional metrics 316 based on the number and corresponding transportation values of the transportation requests 300 across a plurality of geocoded areas and regions.

According to one or more embodiments, the regional accumulation system 102 determines the accumulating regional metrics 316 by utilizing one or more objective functions. For instance, the regional accumulation system 102 can determine conversion probabilities adjusted according to transportation values of transportation requests (e.g., indicating requester device elasticity). In some embodiments, the regional accumulation system 102 can also consider provider device elasticity (e.g., time, location, and/or value based elasticity that will result in increasing or decreasing provider device response based on the accumulating regional metric and other regional features). For example, the regional accumulation system 102 can iteratively determine conversion probabilities as solving a first objective function subject to a plurality of constraints, as follows:

Maximize: $f^T(d \circ y)$

Subject to: $Md \circ y \leqslant \beta_1 \circ (Ms - R - \beta_0)$ $0 \leqslant y \leqslant \gamma^{max}$ in which y represents a conversion learner model (e.g., monotonically decreasing) that returns the probability that a particular transportation request will convert given some price point at a location. $y^{max} \in \mathbb{R}$ $$\gamma^{max} \in \mathbb{R}_{+}^{n}$$

represents the maximum conversion probability for request demand given a level of price markup that completely suppresses request demand. $M \in \mathbb{R}^{n \times n}$ represents an adjacency matrix mapping for comparing demand and supply at a geocoded neighborhood. Additionally, d, $s \in \mathbb{R}^{n}$ represent a number of transportation requests and a number of transportation providers local to a geocoded area, respectively. $\beta_0$, $\beta_1 \in \mathbb{R}^{n}$ represent a supply-learner-intercept factor and a slope-learner-slope factor respectively output by a supply learner. Specifically, in some cases, the supply-learner-intercept factor $\beta_0$ represents the net flow of transportation providers into a neighborhood (e.g., a negative value indicates inflow and a positive value indicates outflow), and the slope-learner-slope factor represents a transportation provider efficiency, which is determined based on an average number of requests a provider can fulfill.

$$f \in \mathbb{R}_{++}^{n}$$

represents a predicted request metric (e.g., expected fare) originating from each location. $f \in \mathbb{R}^{n}$ represents an allocation of reserved transportation providers across the geocoded areas for the time period, where such an allocation is output by a dynamic raw reserve learner and smoothed to a neighborhood/geohash level.

In one or more embodiments, the regional accumulation system 102 determines the first objective function based on a second objective function that modulates demand via a transportation value metric, as shown:

Maximize: $f^T(d \circ y(x))$

Subject to: $Md \circ y \preccurlyeq \beta_1 \circ (Ms - R - \beta_0)$ $0 \preccurlyeq y \preccurlyeq \gamma^{max}$ in which $x \in \mathbb{R}^{n}$ represents an initial transportation value metric, which includes a measurement of efficiency or value for one or more geocoded areas. For instance, the transportation value metric can include (i) a booking metric indicating a quantity of transportation requests projected for receipt from requesters or acceptance by providers in a time period, (ii) a conversion metric indicating a projected quantity or projected rate at which transportation requests result in completed transportation services across geocoded areas in a time period, (iii) a profit metric indicating a projected monetary profit for matching transportation requests to transportation providers across geocoded areas in a time period, or (iv) a revenue metric indicating a projected quantity of revenue for matching transportation requests to transportation providers across geocoded areas in a time period.

Additionally, as shown above, a transportation value metric constraint is represented as $0 \preccurlyeq x \preccurlyeq x^{max}$. According to one or more embodiments, the transportation value metric constraint includes a constraint on the transportation value metric determined by the objective function. Specifically, the regional accumulation system 102 can set $$x^{max} \in \mathbb{R}_{+}^{n}$$

as the maximum transportation-value metric, which may be the same throughout a single region, and set the transportation-value metric x to greater than or equal to zero. The regional accumulation system 102 thus utilizes the second objective function to maintain a certain level of open supply that maximizes the network throughput in a given geocoded area. In one or more embodiments, the regional accumulation system 102 convexifies the second objective function to create the first objective function via y=y(x). The regional accumulation system 102 can thus utilize the first objective function to maximize over quantiles.

In one or more embodiments, as mentioned, the regional accumulation system 102 also utilizes a geospatial smoothing model to determine the expected contribution of each transportation request to other transportation requests in neighboring geocoded areas. FIG. 3B illustrates a diagram of a plurality of neighboring geocoded areas. In particular, FIG. 3B illustrates a first geocoded area 318 and a second geocoded area 320 including transportation requests that contribute weight with respect to neighboring geocoded areas including a third geocoded area 322 and a fourth geocoded area 324. For example, in one or more embodiments, the third geocoded area 322 and the fourth geocoded area 324 are associated with geocode-specific repositories that have a positive value (e.g., based on previous or current transportation requests occurring within the third geocoded area 322 and the fourth geocoded area 324).

As shown in FIG. 3B, the first geocoded area 318 contributes a weight to the third geocoded area 322 and the fourth geocoded area 324. The first geocoded area 318 may contribute to the third geocoded area 322 and the fourth geocoded area 324 based on a proximity (e.g., travel distance/time) to the neighboring geocoded areas. FIG. 3B also shows that the second geocoded area 320 contributes a weight to the third geocoded area 322. In contrast to the first geocoded area 318, the second geocoded area 320 does not contribute any weight to the fourth geocoded area 324.

In one or more embodiments, the regional accumulation system 102 determines an estimated-time-of-arrival ("ETA")—based on an exponential smoothing function to apply to each transportation request expected to convert in a geocoded area i to determine its relative importance, proxied by proximity, relative to other transportation requests expected to convert in each neighboring geocoded area j. For example, the regional accumulation system 102 can determine ETA based on historic traffic information, speed limits, and road distance to determine the travel distance. In particular, the smoothing function can be represented as:

$$P_{ij} = \frac{\exp\left(-\alpha t^{ETA}(i, j)\right)}{\sum_{k \in nbh(i, \mathcal{G})} \exp\left(-\alpha t^{ETA}(i, k)\right)}$$

where $\alpha$ is a contribution decay constant, $t^{ETA}(i,j)$ represents the ETA from geocoded area i to geocoded area j, and $nbh(i, \mathcal{G})$ returns the neighboring geocoded areas of the input geocoded area i from $\mathcal{G}$. According to some embodiments, these values are fixed with respect to the ETAs. The regional accumulation system 102 can precompute and cache the values to avoid the computational overhead associated with computing these values each time the regional accumulation system 102 generates the accumulating regional metrics.

Furthermore, the regional accumulation system 102 can further determine a weighting matrix representing the contributing weights associated with transportation requests in geocoded areas. More specifically, in one or more embodiments, the weighting matrix is represented as:

$$W = \begin{bmatrix} w_1^T \\ \vdots \\ w_n^T \end{bmatrix}$$

such that each entry $W_{ij}$ represents the contribution to an accumulating regional metric for a provider device in geocoded area i from the geocode-specific repository for geocoded area j. According to the contribution function above, the weights can further be represented as:

$$W_{ij} = \frac{P_{ij}}{\sum_{k \in nbh(i,\mathcal{G})} P_{kj} d_k y_k^*}.$$

Accordingly, the contribution to the geocode-specific repository of geocoded area i from the geocode-specific repository of geocoded area j is the same as the proportional contribution weight (e.g., importance) of a transportation request expected to convert in geocoded area i relative to geocoded area j compared to the contribution weights of other transportation requests in the neighborhood of geocoded area j.

Given a vector of raw, non-negative values in geocode-specific repositories that the regional accumulation system 102 intends to distribute for a region during a time period, in one or more embodiments, represented as $$e \in \mathbb{R}_+^n,$$

the regional accumulation system 102 determines the target accumulating regional metric at geohash i=1, . . . , n is:

$$b_i^{tgt} = w_i^T e$$

In one or more embodiments, the regional accumulation system 102 manages the cumulative events metrics and contributions of each location-based repository for a plurality of geocoded areas and a plurality of regions.

In one or more additional embodiments, the regional accumulation system 102 determines to distribute a proportion of values in location-based repositories as accumulating regional metrics to smooth incoming revenues in the location-based repositories. For instance, if the proportion is 20%, the proportion corresponds to smoothing the revenues over a 5-minute period (or other corresponding time period).

Furthermore, the regional accumulation system 102 can provide temporal smoothing to the accumulating regional metrics over time. For example, the regional accumulation system 102 can penalize differences accumulating regional metrics over time (e.g., as part of applying an objective function to determining accumulating regional metrics for individual regions). This approach can avoid large and rapid fluctuations in accumulating regional metrics over time. In some implementations, the regional accumulation system 102 penalizes or limits temporal fluctuations only in a certain direction (e.g., downward movement of accumulating regional metrics). For example, the regional accumulation system 102 allows for (e.g., does not punish) upward movement in accumulating regional metrics over time to provide rapid response to device imbalances, while penalizing downward movement to avoid undermining provider device confidence and expectations.

As mentioned, the regional accumulation system 102 generates accumulating regional metrics for provider devices based on transportation requests expected to convert in one or more regions, which can be distinct from the cumulative events metrics stored in the location-based repositories. In one or more embodiments, the regional accumulation system 102 determines a target accumulating regional metric $b^{tgt}$ based on the values in the location-based repositories indicating a lack of supply relative to available supply $s_0$. The regional accumulation system 102 can determine an optimal accumulating regional metric $$b \in \mathbb{R}_+^n$$

to provide to provider devices in one or more regions for a current time period and the corresponding contributions of each location-based repository $C \in \mathbb{R}^{n \times n}$, where $C_{ij}$ represents the contribution to an accumulating regional metric of a provider device in geohash i from the location-based repository of geohash j.

In one or more embodiments, the regional accumulation system 102 minimizes a difference between an accumulating regional metric and a target accumulating regional metric to prioritize funds for transportation requests expected to convert to the origination location of the corresponding cumulative events metric. Additionally, the regional accumulation system 102 can utilize a penalty function on differences between adjacent accumulating regional metrics in one or more regions to spatially smooth the accumulating regional metrics for consistency. This can allow the regional accumulation system 102 to ensure sufficient cumulative events metrics for each accumulating regional metric that corresponds to an expected request conversion. According to one or more embodiments, the regional accumulation system 102 utilizes an accumulating regional metric generation model represented as:

$$\text{Minimize } \|b - b^{tgt}\| + \gamma^{diff}\|Db\|_2^2 + \gamma^{prev}\|(b - b^{prev})_-\|_1 + \gamma^{clear}\left\|1^T \operatorname{diag}(d \circ y^*)b - 1^T Ce\right\|_1$$

Subject to $\operatorname{diag}(d^\circ y^*)b \preccurlyeq Ce$ $b^{min} \preccurlyeq b\mathbb{R}\ b^{max}$ $C^T 1 \preccurlyeq 1,\ 0 \le C \le C^{max}$ As further shown above, $b^{min}$, $$b^{max} \in \mathbb{R}_+^n$$

represents minimum and maximum accumulating regional metrics. Additionally, $$C^{max} \in \mathbb{R}_+^{n \times n}$$

represents a cap (e.g., maximum value) of contributions by a geocode-specific repository, in which the regional accumulation system 102 sets $$C_{ij}^{max}$$

to 1 if j is a geohash j is within a specific proximity of geohash i, and 0 otherwise (e.g., a minimum contribution proportion). Furthermore, $\gamma^{diff} \in \mathbb{R}_{++}$, $\gamma^{prev} \in \mathbb{R}_{++}$, and $\gamma^{clear} \in \mathbb{R}_{++}$ represent positive scalar parameters for the accumulating regional metric and target accumulating regional metric difference (e.g., the difference between a bonus value and target bonus value) for corresponding penalty terms.

Furthermore, in one or more embodiments, the regional accumulation system 102 provides a post-computation constraint $\operatorname{diag}(d^{\circ}y^{*})b \preccurlyeq Ce$ according to the contribution of each geocode-specific repository to an accumulating regional metric. In other words, the ith element:

$$(Ce)_i = \sum_{k=1}^{m} C_{ik} e_k$$

indicates a budget amount allocated to geohash i. The proportion of the contribution from j to i is thus:

$$\frac{C_{ij} e_j}{(Ce)_i}$$

According to one or more embodiments, the regional accumulation system 102 provides a dictionary of the repository identifiers and their corresponding contribution portions for each accumulating regional metric for a specific template rather than the expected contribution in monetary value. The regional accumulation system 102 can thus standardize the contributions per accumulating regional metric to sum to unity. Any system referring to the template contributions can thus convert the standardized value of an expected contribution to a monetary value.

In additional embodiments, the above model minimizes penalty terms with scalar parameters. For example, $$\|Db\|_2^2$$

represents a spatial smoothing penalty that the model utilizes to reduce the difference between accumulating regional metrics in geographically adjacent locations. Additionally, $\|(b-b^{prev})\_\|_1$ represents a temporal smoothing penalty that the model utilizes to reduce the difference between accumulating regional metrics b and the previous set of accumulating regional metrics $b^{prev}$ if the difference is negative. Thus, the regional accumulation system 102 can ignore value increases compared to previous values while preventing decreases relative to previous values in some regions. Furthermore, $\|1^T \operatorname{diag}(d^{\circ}y^{*})b-1^T Ce\|_1$ represents a budget clearance penalty that the model utilizes to reduce the difference between the amount of money spent across all regions and the values stored in the location-based accounts.

Figure 3C:
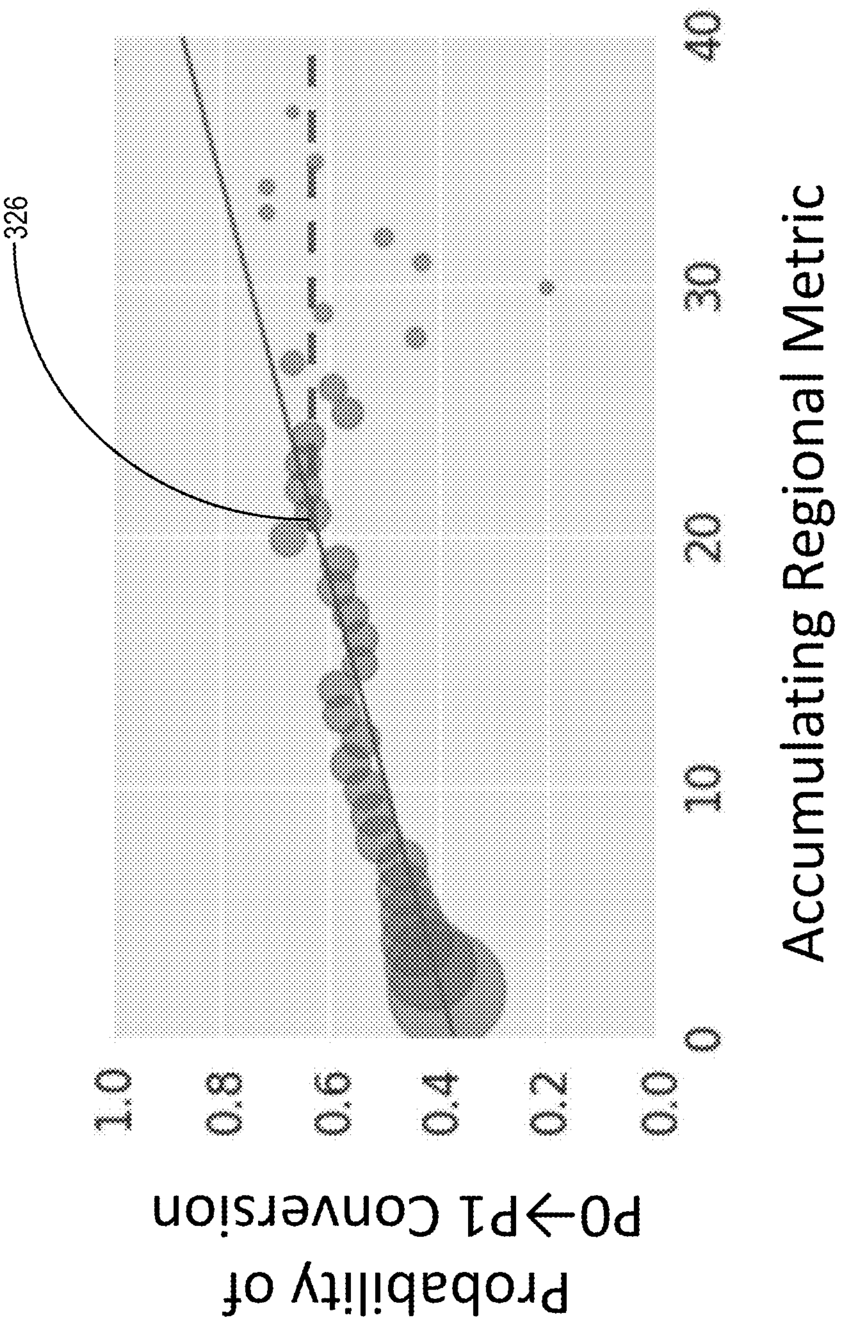
FIG. 3C illustrates a graph diagram of predicted provider device conversions relative to accumulating regional metrics in accordance with one or more embodiments.

In one or more embodiments, the regional accumulation system 102 also determines accumulating regional metrics for regions based on historical rates for P0-to-P1 conversion relative to accumulating regional metrics. For example, the regional accumulation system 102 can utilize a machine-learning model (e.g., a linear regression model) trained on historical data associated with provider devices (including provider device positioning, region distance, etc.) to determine specific accumulating regional metrics at which providers are most likely to go online. FIG. 3C illustrates that the regional accumulation system 102 can determine an inflection point 326 at which higher accumulating regional metrics are unlikely to provide higher P0-to-P1 conversion and then set the inflection point as a maximum accumulating regional metric threshold. Additionally, in some embodiments, the regional accumulation system 102 determines different maximum accumulating regional metric thresholds for different ETAs from regions with accumulating regional metrics or for inside and outside regions with accumulating regional metrics.

Figure 4A:
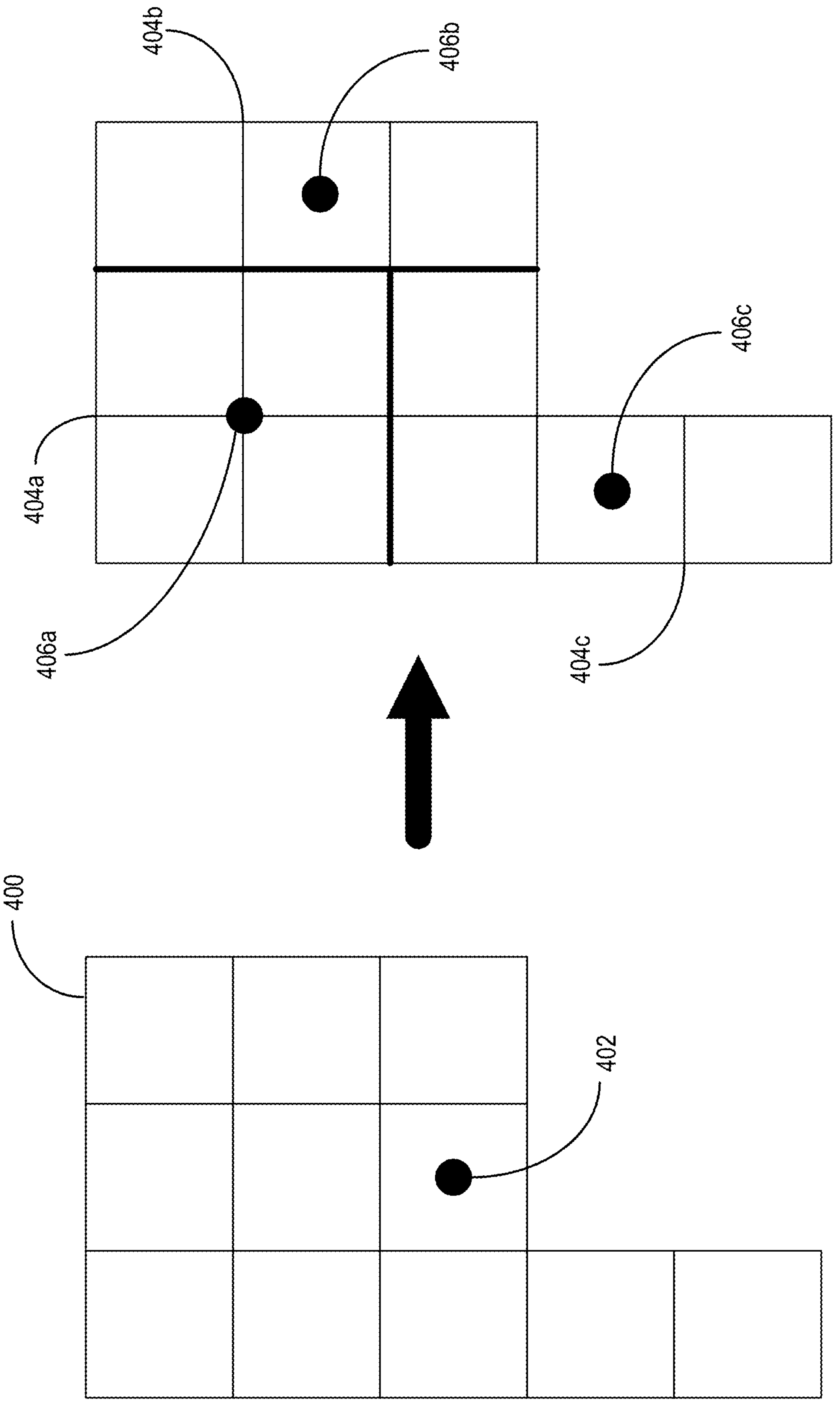
FIGS. 4A-4B illustrate diagrams of accumulating metric pin placement for one or more regions based on region size and shape in accordance with one or more embodiments.
Figure 4B:
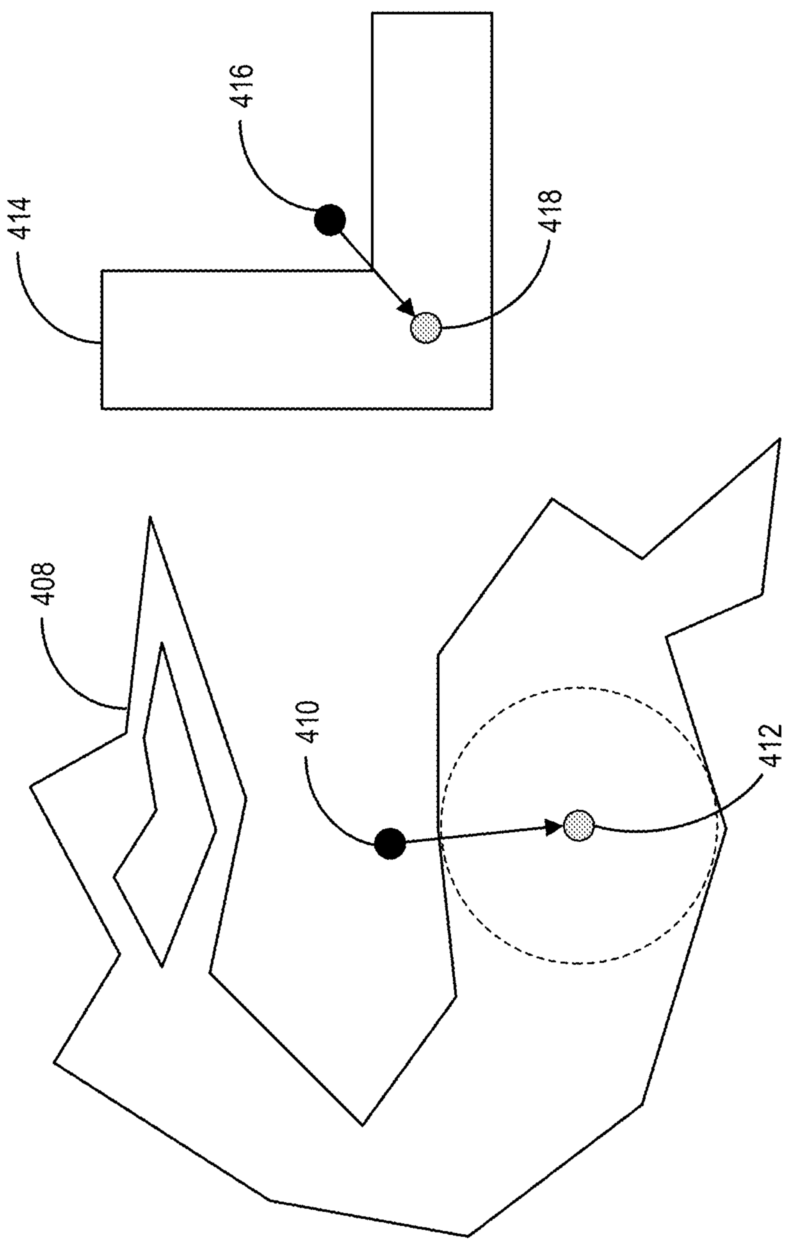

As mentioned, the regional accumulation system 102 provides accumulating regional metric maps to provider device to address underlying device imbalances in improvement network coverage for transportation vehicles in geographical areas. In one or more embodiments, the regional accumulation system 102 inserts one or more accumulating metric pins into one or more regions of an accumulating regional metric map based on accumulating regional metrics for the region(s). FIGS. 4A-4B illustrate diagrams of the regional accumulation system 102 determining placement positions of accumulating metric pins for one or more regions.

For example, FIG. 4A illustrates that the regional accumulation system 102 determines one or more regions including accumulating metric pins for a plurality of neighboring sub-regions. In one or more embodiments, the regional accumulation system 102 determines a plurality of neighboring sub-regions (e.g., geocoded areas) based on accumulating regional metrics for the sub-regions. To illustrate, the regional accumulation system 102 determines accumulating regional metrics for sub-regions based on positive cumulative events metrics in corresponding location-based repositories for the sub-regions. The regional accumulation system 102 can then determine a region 400 (e.g., a cluster of sub-regions) in response to determining that the neighboring sub-regions have the same or similar accumulating regional metrics.

In one or more embodiments, the regional accumulation system 102 determines accumulating regional metrics for a plurality of sub-regions. For instance, the regional accumulation system 102 can determine a plurality of sub-regions that have accumulating regional metrics within a threshold range of values. Specifically, the regional accumulation system 102 can utilize a clustering model to group sub-regions having accumulating regional metrics that are above a minimum value and below a maximum value. To illustrate, the regional accumulation system 102 can utilize a clustering model that determines sub-regions that have accumulating regional metrics of greater than or equal to a first integer (e.g., 2) and less than a second integer (e.g., 3). In alternative embodiments, the regional accumulation system 102 utilizes a clustering model that groups sub-regions with the same accumulating regional metrics (e.g., the accumulating regional metrics for the sub-regions are the same value). For example, the regional accumulation system 102 can utilize a connected-component labeling algorithm (e.g., a 4-connectivity variant) to generate clusters of sub-regions.

In one or more embodiments, as used herein, the term "accumulating cluster metric" refers to a combined value representing accumulating regional metrics of a plurality of regions or sub-regions. Specifically, the regional accumulation system 102 determines an accumulating cluster metric for a cluster of sub-regions by determining a lowest threshold value associated with the accumulating regional metrics of the sub-regions. For example, in response to clustering sub-regions that have accumulating regional metrics between a first value and a second value, the regional accumulation system 102 can select the first value as the accumulating cluster value. Alternatively, the regional accumulation system 102 can select an average value (e.g., mean or median value), a maximum value, or other representative value for the accumulating regional metrics of the corresponding sub-regions. Additionally, if the representative value of the cluster changes based on one or more accumulating regional metrics and/or sub-regions within the cluster changing, the regional accumulation system 102 can update the accumulating cluster metric.

The regional accumulation system 102 can utilize a model for determining the accumulating regional metrics for sub-regions according to the selected clustering model. To illustrate, the regional accumulation system 102 can utilize a model that generates integer values of accumulating regional metrics or a model that generates float values (e.g., decimal) of accumulating regional metrics based on the selected clustering model. In alternative embodiments, the regional accumulation system 102 selects the clustering model based on whether the accumulating regional metrics are integer values or float values.

As illustrated in FIG. 4A, the regional accumulation system 102 determines a placement location for an accumulating metric pin 402 based on the region 400. As used herein, the term "accumulating regional metric pin" refers to a graphical indicator of one or more accumulating regional metrics associated with one or more regions or sub-regions. For example, the regional accumulation system 102 determines a central point or a centroid of the region 400. The regional accumulation system 102 then places the accumulating metric pin 402 at the selected point of the region 400 when displaying the accumulating regional metric map at a provider device to indicate a specific value or range of accumulating regional metrics associated with the region 400. Accordingly, the accumulating metric pin 402 includes an accumulating cluster pin representing the region 400, which is a cluster of sub-regions having similar or equal accumulating regional metrics. Thus, as used herein, the term "accumulating cluster pin" refers to a graphical indicator of a pin representing one or more accumulating regional metrics for a plurality of neighboring regions or sub-regions.

In one or more embodiments, the regional accumulation system 102 determines to subdivide a region into a plurality of regions. Specifically, the regional accumulation system 102 can determine that a size or a shape of the region does not satisfy a threshold size or a threshold shape. For instance, the regional accumulation system 102 determines a threshold size including a maximum size of regions. The regional accumulation system 102 compares the region 400 to the threshold size and determines to subdivide the region 400 in response to the region 400 not meeting the threshold size. In alternative, the regional accumulation system 102 can compare the region 400 to a threshold shape (e.g., a convex shape or shape with a certain width/length ratio) to determine whether the region 400 is non-convex, long, etc. The regional accumulation system 102 can then determine to subdivide the region 400 if the region 400 does not meet the threshold shape.

As illustrated in FIG. 4A, the regional accumulation system 102 subdivides the region 400 into a plurality of subdivisions (a first subdivision 404*a*, a second subdivision 404*b*, and a third subdivision 404*c*). In some embodiments, the regional accumulation system 102 recursively subdivides the region 400 until a smallest subdivision (e.g., according to geographical area, geographical length, or number of sub-regions) meets the corresponding threshold size and/or threshold shape. For instance, in response to subdividing the region 400, the regional accumulation system 102 can determine that the third subdivision 404*c* meets the threshold size and/or threshold shape, the regional accumulation system 102 can terminate the subdivision process. In alternative embodiments, the regional accumulation system 102 subdivides the region until a largest subdivision meets the threshold(s).

In some embodiments, the regional accumulation system 102 subdivides a region along an axis that passes through a centroid of the region until the smallest subdivision meets the threshold(s). For instance, the regional accumulation system 102 subdivides along a line intersecting centroids of a convex hull of the region and a shape of the region. To illustrate, the regional accumulation system 102 utilizes a subdivision model that generates a convex hull from a set of points in the region in O(n log n) time. In alternative embodiments, the regional accumulation system 102 subdivides a region along other subdivision lines based on approximate size, shape, and/or number of sub-regions of the subdivisions.

As illustrated in FIG. 4A, after subdividing the region 400, the regional accumulation system 102 places new accumulating regional metric pins for the subdivisions. For example, the regional accumulation system 102 determines a centroid of each subdivision for placing the accumulating regional metric pins. To illustrate, the regional accumulation system 102 places a first accumulation subdivision pin 406*a* in the first subdivision 404*a*, a second accumulation subdivision pin 406*b* in the second subdivision 404*b*, and a third accumulation subdivision pin 406*c* in the third subdivision 404*c*.

In one or more embodiments, the regional accumulation system 102 determines an accumulating regional metric pin for a region at a point other than a centroid of the region. FIG. 4B illustrates that the regional accumulation system determines accumulating regional metric pins for a plurality of regions for which the centroids are positioned outside a boundary of the regions. Specifically, FIG. 4B illustrates a first region 408 having a c-shape including a centroid 410 outside a boundary of the regional accumulation system 102. Because the centroid 410 lies outside the boundary of the first region 408, the regional accumulation system 102 can determine a new placement position 412 of the accumulating regional metric pin.

In one or more embodiments, the regional accumulation system 102 determines the new placement position 412 of the accumulating regional metric pin at a point within the first region 408. For instance, the regional accumulation system 102 determines a pole of inaccessibility for the first region 408. In particular, as used herein, the term "pole of inaccessibility" refers to a point within a polygon that is farthest from any edges of the polygon. To illustrate, the regional accumulation system 102 can utilize a function (e.g., a grid-based algorithm) to determine the pole of inaccessibility by covering a polygon (e.g., defined by the region) with square cells and then iteratively splitting and pruning the square cells according to a maximum potential distance from a point inside each cell within the polygon. Thus, the regional accumulation system 102 determines the pole of inaccessibility to place the accumulating regional metric pin within a boundary of the region. This approach can assist in avoiding placement of an accumulating regional metric pin in a location that is not available to provide transportation services or that does not have an accumulating regional metric. For example, the regional accumulation system 102 can avoid providing accumulating regional metric pins or corresponding region designators on a runway/airstrip of an airport with areas of high demand nearby/surrounding the runway/airstrip.

In one or more additional embodiments, rather than determining a pole of inaccessibility via a grid-based algorithm based on a polygon defined by one or more regions, the regional accumulation system 102 utilizes predefined geocoded areas. For example, the regional accumulation system 102 can determine the pole of inaccessibility for a region as a geohash of inaccessibility. Specifically, the regional accumulation system 102 finds one or more geohashes within a cluster that is farthest from edges of the region. The regional accumulation system 102 can then find the center of the geohash of inaccessibility in the cluster. Additionally, the regional accumulation system 102 can jitter the location for pin placement (e.g., via slight movement of a pin) to reduce a grid-like appearance of the pin placement and/or region.

FIG. 4B illustrates a second region 414 for which the regional accumulation system 102 determines that a centroid 416 of the second region 414 is outside the boundary of the second region 414. Accordingly, the regional accumulation system 102 can identify a new placement position 418 of an accumulating regional metric for the second region 414 within the boundary of the second region 414. As illustrated, the regional accumulation system 102 utilizes a function to determine that the new placement position 418 is farthest from corresponding edges of the second region 414. Accordingly, regardless of the shape of a region, the regional accumulation system 102 can efficiently determine a point within the region for placing an accumulating regional metric pin.

FIGS. 5A-5C illustrate a plurality of graphical user interfaces of a provider device 500 in connection with displaying a map of one or more regions with high demand. In particular, as mentioned, the regional accumulation system 102 provides an accumulating regional metric map 502 within a provider application associated with a transportation matching system. For instance, the regional accumulation system 102 determines a plurality of regions based on a plurality of neighboring sub-regions having the same or similar accumulating regional metrics that indicate an imbalance of network coverage in the sub-regions. In some embodiments, the regional accumulation system 102 also determines one or more sub-regions for a cluster separated by a distance (i.e., not directly adjacent) based on historical data indicating relationships the sub-regions. To illustrate, the regional accumulation system 102 can determine that transportation requests starting in one sub-region often end in another sub-region.

As illustrated in FIG. 5A, the provider device 500 receives the accumulating regional metric map 502 from the regional accumulation system 102. In one or more embodiments, the accumulating regional metric map 502 includes a plurality of region markers indicating regions associated with accumulating regional metrics. To illustrate, the provider device 500 displays a first region marker 504*a* associated with a first region, a second region marker 504*b* associated with a second region, a third region marker 504*c* associated with a third region, and a fourth region marker 504*d* associated with a fourth region. According to some embodiments, each of the regions encompasses a specific number and position of sub-regions (e.g., geocoded areas such as neighborhoods), which may differ from region to region according to the number and locations of transportation requests across the different regions.

In one or more embodiments, each of the regions may be associated with different accumulating regional metrics. For example, as illustrated in FIG. 5A, the provider device 500 displays a plurality of accumulating regional metric pins within the regions. Specifically, FIG. 5A illustrates that the first region marker 504*a* includes a first accumulating regional metric pin 506*a*, the second region marker 504*b* includes a second accumulating regional metric pin 506*b*, the third region marker 504*c* includes a third accumulating regional metric pin 506*c*, and the fourth region marker 504*d* includes a fourth accumulating regional metric 506*d*. As further illustrated, each of the accumulating regional metric pins includes a numerical value of the accumulating regional metric for the corresponding region.

In various embodiments, the provider device 500 displays the region markers with different visual characteristics to distinguish the regions. For example, the provider device 500 can display the region markers with a specific color based on the values of the corresponding accumulating regional metric pins. Additionally, while FIG. 5A illustrates the region markers having hard boundaries, the provider device 500 can alternatively display the region markers with soft boundaries or blurred edges. In additional embodiments, the amount of blur at the edges (or in specific portions of a region) may be based on differing accumulating regional metrics of the sub-regions within a single region or a size of the region. In some embodiments, the regional accumulation system 102 can also provide accumulating regional metric maps with regions indicated by highlighting specific streets or zones corresponding to accumulating regional metrics, instead of, or in addition to, providing region markers that cover an entire region.

According to one or more embodiments, the provider device 500 includes a position marker 508 of the provider device 500. To illustrate, the provider device 500 includes a location sensor (e.g., GPS) to determine a location of the provider device 500. The provider device 500 can then display the position marker 508 within the accumulating regional metric map 502. As the provider device 500 moves within or through regions, the provider device 500 can update the position marker 508 within the accumulating regional metric map 502.

In some embodiments, the regional accumulation system 102 monitors movement of the provider device 500 to determine whether the provider device 500 enters or is otherwise located within a region having an accumulating regional metric. In response to determining that the provider device 500 is located within a region with an accumulating regional metric, the regional accumulation system 102 can provide a notification 510 for display at the provider device 500. For instance, the regional accumulation system 102 can provide the notification 510 including a message indicating that the provider device 500 is within a region with an accumulating regional metric. The notification 510 can also include a message indicating for the provider device 500 to go online (e.g., sign into the transportation matching system) to unlock a bonus based on the accumulating regional metric of the region. Furthermore, FIG. 5A illustrates that the provider device 500 displays an online element 512 for the provider device 500 to go online or sign into the transportation matching system.

As mentioned above, the regional accumulation system 102 can provide the accumulating regional metric map 502 across an entire population of provider devices. Indeed, the regional accumulation system 102 can reduce computational resources by determining accumulating regional values and then providing the accumulating regional metric map 502 for a population of provider devices within a distance radius of a particular region.

The regional accumulation system 102 can also reduce computational resources by generating the accumulating regional metric map 502 at a server device and then transmitting the accumulating regional metric map 502 to the provider device 500. For example, the regional accumulation system 102 can determine accumulating metric values (and corresponding regions) of the accumulating regional metric map 502, flatten the information to a single digital image (e.g., an image of different fog areas outlining the regions and values), compress the digital image, and ship the digital image to a plurality of provider devices. The provider devices can then fetch the digital image (e.g., of the regional fog areas indicating different accumulating regional metrics) and provide the digital image as an overlay to an underlying street map.

In response to determining that the provider device 500 is online within a region with an accumulating regional metric, the regional accumulation system 102 can determine an accumulating regional metric for the provider device 500. Specifically, the regional accumulation system 102 can determine the accumulating regional metric for the provider device 500 according to an accumulating regional metric indicated within an accumulating regional metric pin of a region in which the provider device 500 is located. To illustrate, in response to determining that the provider device 500 enters the fourth region corresponding to the fourth region marker 504*d*, the regional accumulation system 102 can determine the accumulating regional metric equal to a value indicated by the first accumulating regional metric pin 506*a* (e.g., $8).

In one or more embodiments, the accumulating regional metric pin for each region displays an exact value of the accumulating regional metric for the region. Accordingly, if the accumulating regional metric has a value of "8," the corresponding accumulating regional metric pin can display "8." In alternative embodiments, the regional accumulation system 102 can determine values for the accumulating regional metric pins that are different than the accumulating regional metrics (e.g., by rounding the accumulating regional metrics down to the nearest integer.) Thus, if the accumulating regional metric for a region is "8.35," the regional accumulation system 102 can round the value of the accumulating regional metric pin down to 8 and display the accumulating regional metric pin at the provider device 500 with the rounded value. In some embodiments, the regional accumulation system 102 can thus determine a value for an accumulating regional metric pin for a plurality of sub-regions between a first value (e.g., "8" to "9") and then display the lower value for the accumulating regional metric pin.

In one or more embodiments, the regional accumulation system 102 applies a time threshold to accumulating regional metrics for regions. For example, the regional accumulation system 102 can determine an accumulating regional metric for a region and then cause the provider device 500 to display an accumulating regional metric pin with a value based on the accumulating regional metric. The regional accumulation system 102 can apply the time threshold (e.g., by freezing the accumulating regional metric) to the accumulating regional metric to maintain the value of the accumulating regional metric pin at the same accumulating regional metric until at least a certain amount of time passes to prevent rapidly changing values of accumulating regional metric pins displayed to provider devices. Additionally, the regional accumulation system 102 can update an accumulating regional metric in response to a provider device entering the region and after applying the accumulating regional metric to the provider device. In some embodiments, the regional accumulation system 102 continuously updates accumulating regional metrics for regions until the provider device 500 displays an accumulating regional metric pin for a region. The regional accumulation system 102 can then apply the time threshold only in response to the provider device 500 displaying the accumulating regional metric pin.

In some embodiments, the regional accumulation system 102 also applies a minimum accumulating regional metric threshold for displaying region markers and corresponding accumulating regional metric pins. For instance, the regional accumulation system 102 utilizes the minimum accumulating regional metric threshold to filter out regions that do not have accumulating regional metrics above the threshold. In one or more embodiments, the regional accumulation system 102 determines the minimum accumulating regional metric threshold based on historical data associated with responses of provider devices to marked regions.

According to one or more embodiments, the regional accumulation system 102 also modifies the accumulating regional metric map 502 in response to a change in position or zoom level within the provider application. To illustrate, in response to an input to zoom in on the accumulating regional metric map 502, the provider device 500 can update the accumulating regional metric map 502. Updating the accumulating regional metric map 502 can involve the regional accumulation system 102 modifying one or more clusters associated with accumulating regional metric pins. Specifically, the regional accumulation system 102 can subdivide a region into a plurality of subdivisions with a plurality of different accumulating regional metric pins based on the zoom level. The regional accumulation system 102 can update the accumulating regional metric pin values and locations according to the subdivisions.

Similarly, the regional accumulation system 102 can combine regions by utilizing a clustering model to generate a combined cluster of regions in response to zooming out on the accumulating regional metric map 502. For instance, the regional accumulation system 102 can combine a plurality of regions with different accumulating regional metric pin values. In such cases, the regional accumulation system 102 can display a single accumulating regional metric pin for the combined region with a single value. To illustrate, the regional accumulation system 102 can display the lowest accumulating regional metric of the plurality of regions initially. As the provider device 500 moves into the region, the regional accumulation system 102 can provide more detailed information to the provider device 500 with more accurate accumulating regional metric pin values.

The regional accumulation system 102 can provide a variety of user interface elements illustrating notifications or guidance related to accumulating regional metric maps and accumulating regional values. For example, the regional accumulation system 102 can provide notifications/guidance prompting a provider device to drive to a region (with an indication of the corresponding accumulating regional values available in the region). Similarly, the regional accumulation system 102 can provide notifications when an accumulating regional metric has been attributed to the provider device.

In response to the provider device 500 entering into a region with an accumulating regional metric or going online, the regional accumulation system 102 can apply the accumulating regional metric to the provider device 500. FIG. 5B illustrates that the provider device 500 displays an initial bonus notification 514 within the provider application. To illustrate, the regional accumulation system 102 can provide the initial bonus notification 514 with a value based on the accumulating regional metric pin of the corresponding region. As illustrated, the provider device 500 displays the initial bonus notification 514 with a value of "8" equal to the value of the first accumulating regional metric pin 506*a*. In one or more embodiments, the initial bonus notification 514 may be a persistent notification that remains on the display of the provider device 500 until the accumulating regional metric is realized.

After the regional accumulation system 102 determines an accumulating regional metric for a provider device, the regional accumulation system 102 can apply the accumulating regional metric to the next transportation request fulfilled by the provider device. As illustrated in FIG. 5C, the provider device 500 displays a transportation match involving the provider device 500 and a transportation request 516 associated with a requester device. In particular, the transportation request 516 can include a pick-up location 518 and a destination location 520. In one or more embodiments, the transportation request 516 occurs outside a region of the accumulating regional metric determined for the provider device 500 (e.g., outside the first region indicated by the first region marker 504*a* in FIG. 5A). Furthermore, FIG. 5C illustrates an updated position 508*a* of the provider device 500 within the accumulating regional metric map 502.

Furthermore, FIG. 5C illustrates that the provider device 500 displays a transportation match notification 522 including an indication of the accumulating regional metric for the provider device 500 in connection with the transportation match. In one or more embodiments, the transportation match notification 522 includes the full value of the accumulating regional metric applied to the provider device 500, rather than the rounded value displayed with the accumulating regional metric pin and the initial bonus notification 514. In addition to the transportation match notification 522, the provider device 500 can display an accept element 524 for accepting the transportation match and beginning fulfillment of the transportation request.

After the provider device 500 completes the transportation request, the regional accumulation system 102 can apply the accumulating regional metric to a transportation value associated with the transportation request. For example, the regional accumulation system 102 can add the accumulating regional metric to the transportation value of the transportation request. By providing accumulating regional metrics to provider devices in connection with the provider devices moving through regions of high demand, the regional accumulation system 102 can incentivize provider devices to go online and become available for transportation requests. In some embodiments, the regional accumulation system 102 applies accumulating regional metrics to transportation matches only if the provider devices remain online between obtaining the accumulating regional metric and fulfilling a transportation request.

In one or more embodiments, the regional accumulation system 102 determines a final accumulating regional metric to apply to a transportation match based on an initial accumulating regional metric corresponding to a location/movement of a provider device. In additional embodiments, the regional accumulation system 102 determines the final accumulating regional metric as a higher value of an initial accumulating regional metric corresponding to a provider device location/movement and a value based on a location of a requester device. In alternative embodiments, the regional accumulation system 102 determines the final accumulating regional metric as a higher value of an initial accumulating regional metric based on a provider device location/movement and a midpoint (e.g., average value) associated with a requester device location.

In additional embodiments, the regional accumulation system 102 determines a final accumulating regional metric for a provider device from a plurality of accumulating regional metrics associated with movement of the provider device. For example, the regional accumulation system 102 can detect that a provider device passes through a plurality of regions with accumulating regional metrics. The regional accumulation system 102 can determine the final accumulating regional metric for the provider device based on a highest value of the accumulating regional metrics of the regions through which the provider device moved.

According to real-world experimental results performed by experimenters, the regional accumulation system 102 provides improved network coverage via the use of accumulating regional metrics. For instance, the table below illustrates differences in network coverage results over a time period for a plurality of areas. In particular, as shown, the regional accumulation system 102 provides improved network coverage for most areas by increasing the number of provider devices going online (e.g., converting from P0-to-P1) as a result of the accumulating regional metrics. Additionally, the results indicate increased usage of client applications at the provider devices.

| Region | Provider Time | Application Opens | Shift Volume |
|---|---|---|---|
| All Areas | +4.1% | +24.3% | +11.1% |
| Area 1 | +4.3% | +27.5% | +9.5% |
| Area 2 | +4.0% | +24.5% | +18.8% |
| Area 3 | −3.2% | +9.4% | +3.9% |
| Area 4 | +6.6% | +28.0% | +12.6% |

In addition, the experimental results indicated that by utilizing accumulating regional metrics, the regional accumulation system 102 increased network coverage most significantly during times of undersupply (e.g., when the number of provider devices available is insufficient to fulfill the number of forecasted transportation requests for one or more regions). Specifically, the experimental results indicated that the provider time increased by as low as <1% during times of oversupply and by up to 9% during times of undersupply. Accordingly, by utilizing accumulating regional metrics, the regional accumulation system 102 provides improved network coverage when most needed across various regions.

Figure 6:
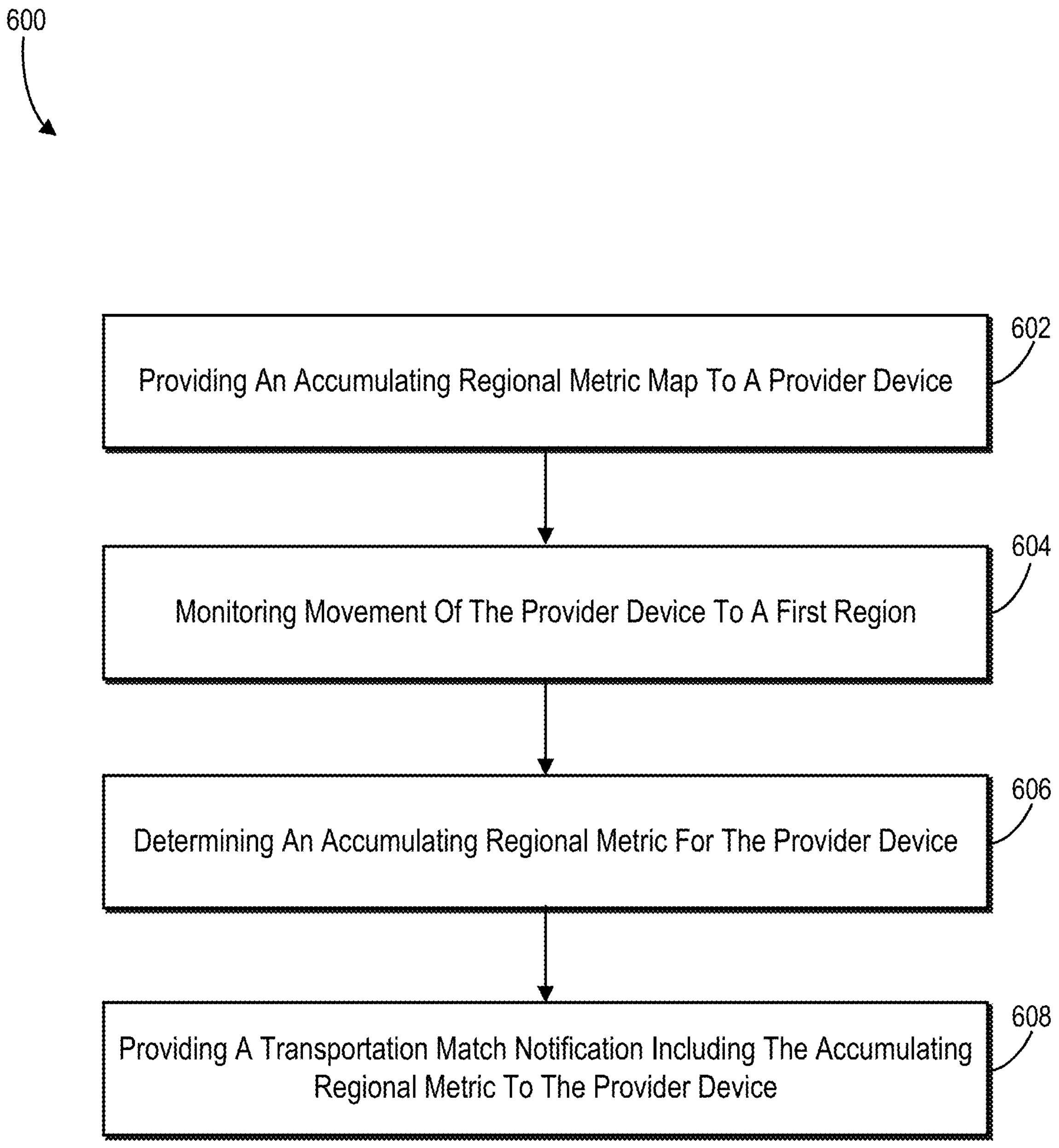
FIG. 6 illustrates a flowchart of a series of acts for determining accumulating regional metrics according to provider device movement across a plurality of regions in accordance with one or more embodiments.

Turning now to FIG. 6, this figure illustrates a flowchart of a series of acts 600 of determining accumulating regional metrics according to provider device movement across a plurality of regions. While FIG. 6 illustrates acts according to one embodiment, alternative embodiments may omit, add to, reorder, and/or modify any of the acts shown in FIG. 6. The acts of FIG. 6 can be performed as part of a method. Alternatively, a non-transitory computer readable storage medium can comprise instructions that, when executed by one or more processors, cause a computing device to perform the acts depicted in FIG. 6. In still further embodiments, a system can perform the acts of FIG. 6.

As shown in FIG. 6, the series of acts 600 include an act 602 of providing an accumulating regional metric map to a provider device. For example, act 602 involves providing, for display via an interface of a provider device, an accumulating regional metric map displaying a plurality of regions and a plurality of accumulating metric pins corresponding to the plurality of regions.

Act 602 can involve determining that accumulating regional metrics corresponding to the plurality of accumulating metric pins meet an accumulating metric threshold. Act 602 can further involve displaying the plurality of accumulating metric pins within the accumulating regional metric map in response to the accumulating regional metrics meeting the accumulating metric threshold. Act 602 can also involve determining a placement location for an accumulating metric pin of the plurality of accumulating metric pins based on a size or a shape of a combined region for a subset of regions of the plurality of regions.

Act 602 can involve determining an accumulating cluster metric for a subset of the plurality of regions utilizing a clustering model based on accumulating regional metrics for the plurality of regions during a time period. Act 602 can also involve providing an accumulating cluster pin for the subset of the plurality of regions with the accumulating cluster metric within the accumulating regional metric map. For example, act 602 can involve generating an accumulating metric pin of the plurality of accumulating metric pins corresponding to the first region and an additional region adjacent to the first region based on the cumulative events metric for the first region and an additional cumulative events metric for the additional region. Act 602 can then involve determining a placement location for the accumulating metric pin based on a size and a position of a combined region comprising the first region and the additional region.

Act 602 can also involve determining that a size or a shape of the subset of the plurality of regions does not meet a threshold size or a threshold shape. Act 602 can involve recursively dividing the subset of the plurality of regions into a plurality of subdivisions until a particular subdivision of the plurality of subdivisions meets the threshold size or the threshold shape. Act 602 can further involve providing subdivision accumulating metric pins for the plurality of subdivisions within the accumulating regional metric map.

Act 602 can also involve determining that a centroid of the subset of the plurality of regions is located outside a boundary of the subset of the plurality of regions. For example, act 602 can involve determining that a centroid of the combined region is outside a boundary of the combined region. Act 602 can then involve placing, within the boundary of the subset of the plurality of regions, the accumulating cluster pin at a position based on distances from edges of the subset of the plurality of regions. For example, act 602 can involve determining a pole of inaccessibility based on distances from edges of the combined region within the boundary of the combined region. Act 602 can then involve determining the placement location for the accumulating metric pin at the pole of inaccessibility.

Furthermore, the series of acts 600 can include generating estimated request conversion scores for the plurality of transportation requests during the time period relative to the plurality of regions based on the locations of the plurality of transportation requests. The series of acts 600 can then include determining the accumulating regional metric for the provider device based on the estimated request conversion scores and the cumulative events metrics.

Act 602, or an additional act, can also involve generating the plurality of accumulating metric pins according to the cumulative events metrics and a plurality of accumulating regional metrics for the plurality of regions during the time period. The series of acts 600 can include placing the plurality of accumulating metric pins within corresponding regions of the accumulating regional metric map.

The series of acts 600 also includes an act 604 of monitoring movement of the provider device to a first region. For example, act 604 involves monitoring movement of the provider device to a first region of the plurality of regions. Act 604 can involve obtaining provider device location data from a location sensor of the provider device. Act 604 can involve determining that the provider device enters the first region.

Additionally, the series of acts 600 includes an act 606 of determining an accumulating regional metric for the provider device. For example, act 606 involves determining an accumulating regional metric for the provider device corresponding to an accumulating metric pin of the first region. Act 606 can involve determining the accumulating regional metric for the provider device utilizing a geospatial smoothing model in connection with a subset of cumulative events metrics corresponding to a plurality of neighboring regions comprising the first region. For example, act 606 can involve utilizing a geospatial smoothing model to determine a contribution of a plurality of cumulative events metrics for a plurality of adjacent regions based on relative predicted conversion probabilities of a set of transportation requests in the plurality of adjacent regions.

Act 606 can involve determining that the provider device moves to an additional region of the plurality of regions. Act 606 can also involve determining that the accumulating regional metric corresponding to the accumulating metric pin of the first region is greater than an additional accumulating regional metric corresponding to an additional accumulating regional metric pin of the additional region. Act 606 can involve selecting the accumulating regional metric corresponding to the accumulating metric pin of the first region for the provider device.

The series of acts 600 can include determining locations of a plurality of transportation requests within the first region for a time period. The series of acts 600 can include generating a cumulative events metric for the first region during the time period based on the locations of the plurality of transportation requests. The series of acts 600 can also include generating estimated request conversion scores for the plurality of transportation requests during the time period. Act 606 can then involve determining the accumulating regional metric for the provider device based on the cumulative events metric for the first region and the estimated request conversion scores.

As part of act 602, or as an additional act, the series of acts 600 include determining a plurality of transportation requests and corresponding locations of the plurality of transportation requests across the plurality of regions for a time period. The series of acts 600 also include generating cumulative events metrics for the plurality of regions during the time period based on plurality of transportation requests and the corresponding locations of the plurality of transportation requests relative to the plurality of regions. Act 606 can then involve determining the accumulating regional metric for the provider device based on the cumulative events metrics for the plurality of regions.

For example, the series of acts 600 can involve generating a cumulative events metric for the first region based on a plurality of transportation requests within the first region for a time period. The series of acts 600 can also involve generating additional cumulative events metrics for additional regions within a proximity of the first region. Act 606 can involve determining the accumulating regional metric for the provider device based on the cumulative events metric for the first region. Act 606 can also involve determining the accumulating regional metric for the provider device based further on the additional cumulative events metrics for the additional regions according to a geospatial smoothing model.

The series of acts 600 further includes an act 608 of providing a transportation match notification including the accumulating regional metric to the provider device. For example, act 608 involves, based on generating a transportation match between the provider device and a requester device located in a second region different from the first region, providing a transportation match notification to the provider device that comprises the accumulating regional metric.

Act 608 can involve generating the transportation match for the provider device involving a transportation request associated with the requester device after determining the accumulating regional metric for the provider device. Act 608 can also involve modifying a transportation provider metric associated with the transportation request based on the accumulating regional metric.

Embodiments of the present disclosure may comprise or utilize a special-purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or generators and/or other electronic devices. When information is transferred, or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface generator (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In one or more embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural marketing features and/or methodological acts, it is to be understood that the subject matter defined in the appended claims is not necessarily limited to the described marketing features or acts described above. Rather, the described marketing features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program generators may be located in both local and remote memory storage devices.

Embodiments of the present disclosure can also be implemented in cloud computing environments. In this description, "cloud computing" is defined as a subscription model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing subscription model can be composed of various characteristics such as, for example, on-demand self-service, broad network access, resource pooling, rapid elasticity, measured service, and so forth. A cloud-computing subscription model can also expose various service subscription models, such as, for example, Software as a Service ("SaaS"), a web service, Platform as a Service ("PaaS"), and Infrastructure as a Service ("IaaS"). A cloud-computing subscription model can also be deployed using different deployment subscription models such as private cloud, community cloud, public cloud, hybrid cloud, and so forth. In this description and in the claims, a "cloud-computing environment" is an environment in which cloud computing is employed.

Figure 7:
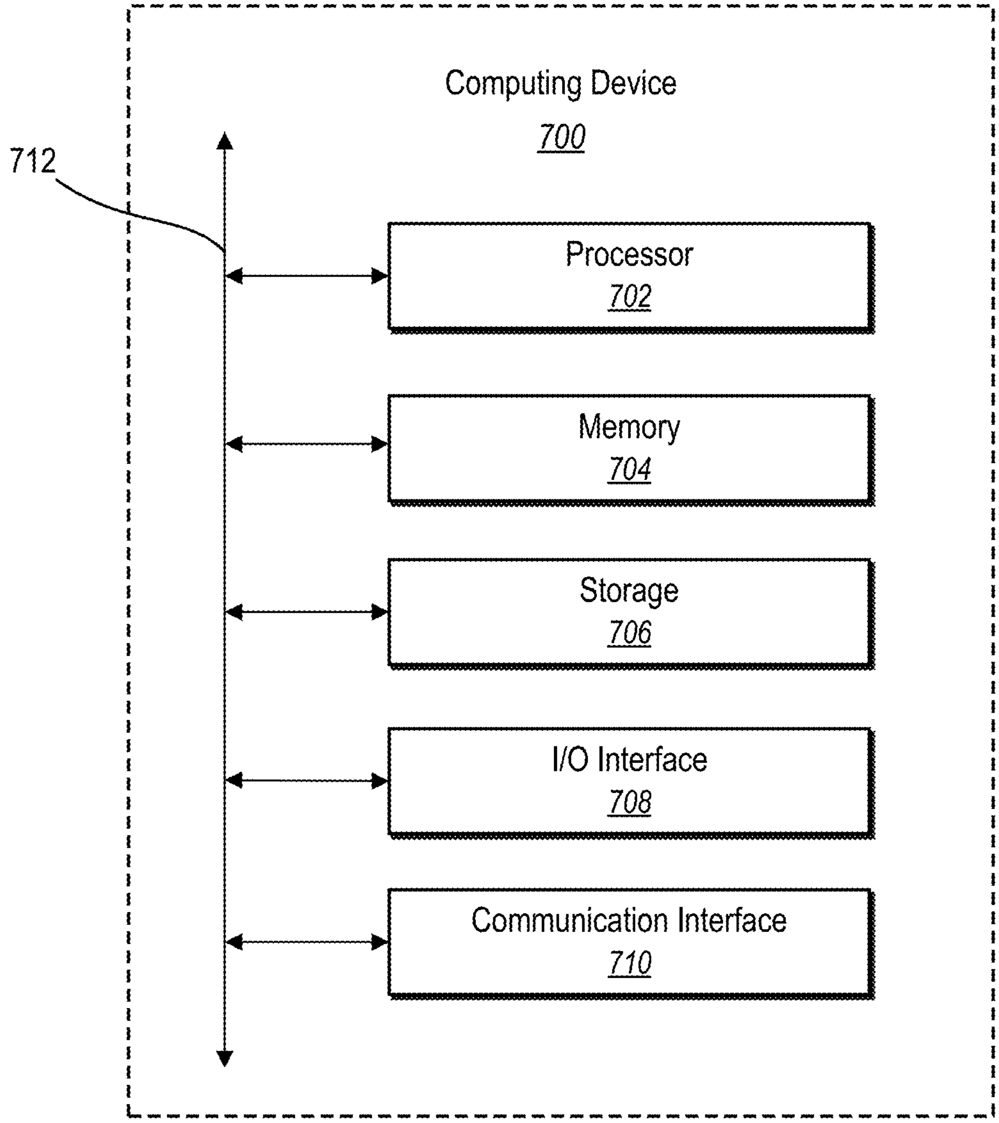
FIG. 7 illustrates a block diagram of a computing device in accordance with one or more embodiments.

FIG. 7 illustrates a block diagram of an example computing device 700 that may be configured to perform one or more of the processes described above. One will appreciate that one or more computing devices, such as the computing device 700 may represent the computing devices described above (e.g., the server(s) 104, the provider devices 110*a*-110*n*, or the requester devices 116*a*-116*n*). In one or more embodiments, the computing device 700 may be a mobile device (e.g., a mobile telephone, a smartphone, a PDA, a tablet, a laptop, a camera, a tracker, a watch, a wearable device, etc.). In some embodiments, the computing device 700 may be a non-mobile device (e.g., a desktop computer or another type of client device). Further, the computing device 700 may be a server device that includes cloud-based processing and storage capabilities.

As shown in FIG. 7, the computing device 700 can include one or more processor(s) 702, memory 704, a storage device 706, input/output interfaces 708 (or "I/O interfaces 708"), and a communication interface 710, which may be communicatively coupled by way of a communication infrastructure (e.g., bus 712). While the computing device 700 is shown in FIG. 7, the components illustrated in FIG. 7 are not intended to be limiting. Additional or alternative components may be used in other embodiments. Furthermore, in certain embodiments, the computing device 700 includes fewer components than those shown in FIG. 7. Components of the computing device 700 shown in FIG. 7 will now be described in additional detail.

In particular embodiments, the processor(s) 702 includes hardware for executing instructions, such as those making up a computer program. As an example, and not by way of limitation, to execute instructions, the processor(s) 702 may retrieve (or fetch) the instructions from an internal register, an internal cache, memory 704, or a storage device 706 and decode and execute them.

The computing device 700 includes the memory 704, which is coupled to the processor(s) 702. The memory 704 may be used for storing data, metadata, and programs for execution by the processor(s). The memory 704 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 704 may be internal or distributed memory.

The computing device 700 includes the storage device 706 for storing data or instructions. As an example, and not by way of limitation, the storage device 706 can include a non-transitory storage medium described above. The storage device 706 may include a hard disk drive ("HDD"), flash memory, a Universal Serial Bus ("USB") drive or a combination these or other storage devices.

As shown, the computing device 700 includes one or more I/O interfaces 708, which are provided to allow a user to provide input to (such as user strokes), receive output from, and otherwise transfer data to and from the computing device 700. These I/O interfaces 708 may include a mouse, keypad or a keyboard, a touch screen, camera, optical scanner, network interface, modem, other known I/O devices or a combination of such I/O interfaces 708. The touch screen may be activated with a stylus or a finger.

The I/O interfaces 708 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 708 are configured to provide graphical data to a display for presentation to a user. The graphical data may be representative of one or more graphical user interfaces and/or any other graphical content as may serve a particular implementation.

The computing device 700 can further include a communication interface 710. The communication interface 710 can include hardware, software, or both. The communication interface 710 provides one or more interfaces for communication (such as, for example, packet-based communication) between the computing device and one or more other computing devices or one or more networks. As an example, and not by way of limitation, communication interface 710 may include a network interface controller ("NIC") or network adapter for communicating with an Ethernet or other wire-based network or a wireless NIC ("WNIC") or wireless adapter for communicating with a wireless network, such as a WI-FI. The computing device 700 can further include the bus 712. The bus 712 can include hardware, software, or both that connects components of computing device 700 to each other.

Figure 8:
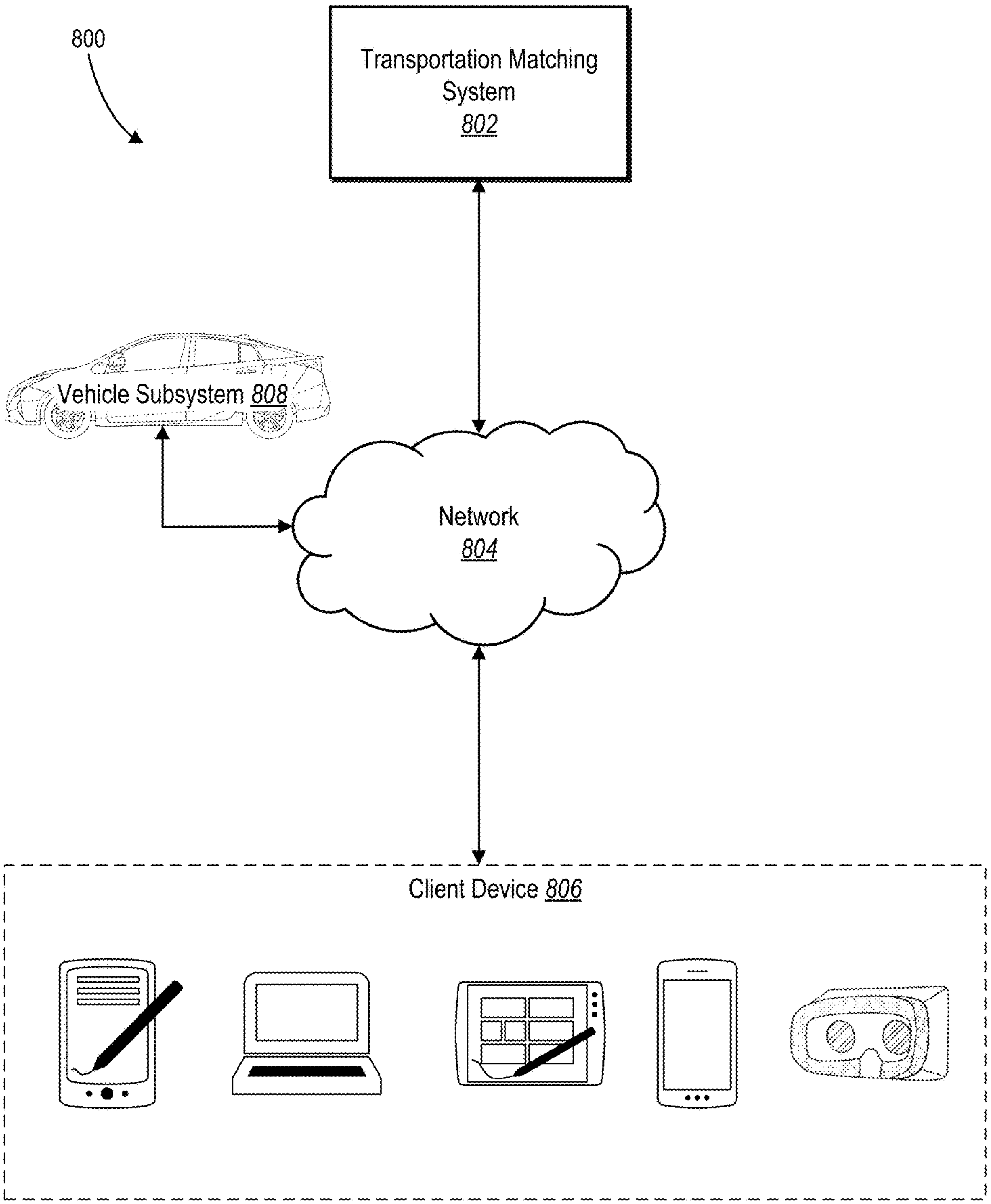
FIG. 8 illustrates an example environment for a transportation matching system in accordance with one or more embodiments.

FIG. 8 illustrates an example network environment 800 of a transportation matching system (e.g., the transportation matching system 112). The network environment 800 includes a client device 806, a transportation matching system 802, and a vehicle subsystem 808 connected to each other by a network 804. Although FIG. 8 illustrates a particular arrangement of the client device 806, the transportation matching system 802, the vehicle subsystem 808, and the network 804, this disclosure contemplates any suitable arrangement of the client device 806, the transportation matching system 802, the vehicle subsystem 808, and the network 804. As an example, and not by way of limitation, two or more of the client device 806, the transportation matching system 802, and the vehicle subsystem 808 communicate directly, bypassing the network 804. As another example, two or more of the client device 806, the transportation matching system 802, and the vehicle subsystem 808 may be physically or logically co-located with each other in whole or in part. Moreover, although FIG. 8 illustrates a particular number of the client devices 806, the transportation matching systems 802, the vehicle subsystems 808, and the networks 804, this disclosure contemplates any suitable number of the client devices 806, the transportation matching systems 802, the vehicle subsystems 808, and the networks 804. As an example, and not by way of limitation, the network environment 800 may include multiple client devices 806, multiple transportation matching systems 802, multiple vehicle subsystems 808, and multiple networks 804.

This disclosure contemplates any suitable network 804. As an example, and not by way of limitation, one or more portions of the network 804 may include an ad hoc network, an intranet, an extranet, a virtual private network ("VPN"), a local area network ("LAN"), a wireless LAN ("WLAN"), a wide area network ("WAN"), a wireless WAN ("WWAN"), a metropolitan area network ("MAN"), a portion of the Internet, a portion of the Public Switched Telephone Network ("PSTN"), a cellular telephone network, or a combination of two or more of these. The network 804 may include one or more networks 804.

Links may connect the client device 806, the transportation matching system 802, and the vehicle subsystem 808 to the network 804 or to each other. This disclosure contemplates any suitable links. In particular embodiments, one or more links include one or more wireline (such as for example Digital Subscriber Line ("DSL") or Data Over Cable Service Interface Specification ("DOCSIS"), wireless (such as for example Wi-Fi or Worldwide Interoperability for Microwave Access ("WiMAX"), or optical (such as for example Synchronous Optical Network ("SONET") or Synchronous Digital Hierarchy ("SDH") links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout the network environment 800. One or more first links may differ in one or more respects from one or more second links.

In particular embodiments, the client device 806 may be an electronic device including hardware, software, or embedded logic components or a combination of two or more such components and capable of carrying out the appropriate functionalities implemented or supported by the client device 806. As an example, and not by way of limitation, a client device 806 may include any of the computing devices discussed above in relation to FIG. 8. A client device 806 may enable a network user at the client device 806 to access a network. A client device 806 may enable its user to communicate with other users at other client devices 806.

In particular embodiments, the client device 806 may include a transportation service application or a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at the client device 806 may enter a Uniform Resource Locator ("URL") or other address directing the web browser to a particular server (such as server), and the web browser may generate a Hyper Text Transfer Protocol ("HTTP") request and communicate the HTTP request to server. The server may accept the HTTP request and communicate to client device 806 one or more Hyper Text Markup Language ("HTML") files responsive to the HTTP request. The client device 806 may render a webpage based on the HTML files from the server for presentation to the user. This disclosure contemplates any suitable webpage files. As an example, and not by way of limitation, webpages may render from HTML files, Extensible Hyper Text Markup Language ("XHTML") files, or Extensible Markup Language ("XML") files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, the transportation matching system 802 may be a network-addressable computing system that can host a ride share transportation network. The transportation matching system 802 may generate, store, receive, and send data, such as, for example, user-profile data, concept-profile data, text data, ride request data, GPS location data, provider data, requester data, vehicle data, or other suitable data related to the ride share transportation network. This may include authenticating the identity of providers and/or vehicles who are authorized to provide ride services through the transportation matching system 802. In addition, the transportation service system may manage identities of service requesters such as users/requesters. In particular, the transportation service system may maintain requester data such as driving/riding histories, personal data, or other user data in addition to navigation and/or traffic management services or other location services (e.g., GPS services).

In particular embodiments, the transportation matching system 802 may manage ride matching services to connect a user/requester with a vehicle and/or provider. By managing the ride matching services, the transportation matching system 802 can manage the distribution and allocation of vehicle subsystem resources and user resources such as GPS location and availability indicators, as described herein.

The transportation matching system 802 may be accessed by the other components of the network environment 800 either directly or via network 804. In particular embodiments, the transportation matching system 802 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, the transportation matching system 802 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable the client device 806 or the transportation matching system 802 to manage, retrieve, modify, add, or delete, the information stored in data storage.

In particular embodiments, the transportation matching system 802 may provide users with the ability to take actions on various types of items or objects, supported by the transportation matching system 802. As an example, and not by way of limitation, the items and objects may include ride share networks to which users of the transportation matching system 802 may belong, vehicles that users may request, location designators, computer-based applications that a user may use, transactions that allow users to buy or sell items via the service, interactions with advertisements that a user may perform, or other suitable items or objects. A user may interact with anything that is capable of being represented in the transportation matching system 802 or by an external system of a third-party system, which is separate from the transportation matching system 802 and coupled to the transportation matching system 802 via the network 804.

In particular embodiments, the transportation matching system 802 may be capable of linking a variety of entities. As an example, and not by way of limitation, the transportation matching system 802 may enable users to interact with each other or other entities, or to allow users to interact with these entities through an application programming interfaces ("API") or other communication channels.

In particular embodiments, the transportation matching system 802 may include a variety of servers, sub-systems, programs, modules, logs, and data stores. In particular embodiments, the transportation matching system 802 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The transportation matching system 802 may also include suitable components such as network interfaces, security mechanisms, load balancers, failover servers, management-and-network-operations consoles, other suitable components, or any suitable combination thereof. In particular embodiments, the transportation matching system 802 may include one or more user-profile stores for storing user profiles. A user profile may include, for example, biographic information, demographic information, behavioral information, social information, or other types of descriptive information, such as work experience, educational history, hobbies or preferences, interests, affinities, or location.

The web server may include a mail server or other messaging functionality for receiving and routing messages between the transportation matching system 802 and one or more client devices 806. An action logger may be used to receive communications from a web server about a user's actions on or off the transportation matching system 802. In conjunction with the action log, a third-party-content-object log may be maintained of user exposures to third-party-content objects. A notification controller may provide information regarding content objects to the client device 806. Information may be pushed to the client device 806 as notifications, or information may be pulled from the client device 806 responsive to a request received from the client device 806. Authorization servers may be used to enforce one or more privacy settings of the users of the transportation matching system 802. A privacy setting of a user determines how particular information associated with a user can be shared. The authorization server may allow users to opt in to or opt out of having their actions logged by the transportation matching system 802 or shared with other systems, such as, for example, by setting appropriate privacy settings. Third-party-content-object stores may be used to store content objects received from third parties. Location stores may be used for storing location information received from the client devices 806 associated with users.

In addition, the vehicle subsystem 808 can include a human-operated vehicle or an autonomous vehicle. A provider of a human-operated vehicle can perform maneuvers to pick up, transport, and drop off one or more requesters according to the embodiments described herein. In certain embodiments, the vehicle subsystem 808 can include an autonomous vehicle—i.e., a vehicle that does not require a human operator. In these embodiments, the vehicle subsystem 808 can perform maneuvers, communicate, and otherwise function without the aid of a human provider, in accordance with available technology.

In particular embodiments, the vehicle subsystem 808 may include one or more sensors incorporated therein or associated thereto. For example, sensor(s) can be mounted on the top of the vehicle subsystem 808 or else can be located within the interior of the vehicle subsystem 808. In certain embodiments, the sensor(s) can be located in multiple areas at once—i.e., split up throughout the vehicle subsystem 808 so that different components of the sensor(s) can be placed in different locations in accordance with optimal operation of the sensor(s). In these embodiments, the sensor(s) can include a LIDAR sensor and an inertial measurement unit ("IMU") including one or more accelerometers, one or more gyroscopes, and one or more magnetometers. The sensor suite can additionally or alternatively include a wireless IMU ("WIMU"), one or more cameras, one or more microphones, or other sensors or data input devices capable of receiving and/or recording information relating to navigating a route to pick up, transport, and/or drop off a requester.

In particular embodiments, the vehicle subsystem 808 may include a communication device capable of communicating with the client device 806 and/or the transportation matching system 802. For example, the vehicle subsystem 808 can include an on-board computing device communicatively linked to the network 804 to transmit and receive data such as GPS location information, sensor-related information, requester location information, or other relevant information.

In the foregoing specification, the invention has been described with reference to specific exemplary embodiments thereof. Various embodiments and aspects of the invention (s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A method comprising:

providing, for display via an interface of a provider device, an accumulating regional metric map displaying:

a first region having a first accumulating metric pin comprising a value of a first accumulating regional metric that the provider device can attain by entering the first region, and a second region having a second accumulating metric pin comprising a value of a second accumulating regional metric that the provider device can attain by entering the second region, wherein the second region is different from the first region and does not overlap with the first region;

monitoring movement of the provider device to the first region;

determining the first accumulating regional metric corresponding to the first accumulating metric pin of the first region for the provider device in response to monitoring the movement of the provider device to the first region;

monitoring movement of the provider device from the first region to an area outside the first region and the second region; and based on generating a transportation match between the provider device and a requester device located in the area outside the first region and the second region, providing a transportation match notification to the provider device for the transportation match that comprises the first accumulating regional metric corresponding to the first accumulating metric pin of the first region.

2. The method as recited in claim 1, further comprising:

determining a plurality of transportation requests and corresponding locations of the plurality of transportation requests across a plurality of regions for a time period, the plurality of regions comprising the first region and the second region;

generating cumulative events metrics for the plurality of regions during the time period based on the plurality of transportation requests and the corresponding locations of the plurality of transportation requests relative to the plurality of regions; and determining the first accumulating regional metric for the provider device based on the cumulative events metrics for the plurality of regions.

3. The method as recited in claim 2, wherein generating the cumulative events metrics for the plurality of regions comprises:

generating estimated request conversion scores for the plurality of transportation requests during the time period relative to the plurality of regions based on the locations of the plurality of transportation requests; and determining the first accumulating regional metric for the provider device based on the estimated request conversion scores and the cumulative events metrics.

4. The method as recited in claim 1, further comprising determining that the provider device is within the area outside the first region and the second region when generating the transportation match between the provider device and the requester device, wherein the area outside the first region and the second region does not have any accumulating regional metric associated with it.

5. The method as recited in claim 4, further comprising determining that the provider device remains online between obtaining the first accumulating regional metric and generating the transportation match.

6. The method as recited in claim 1, wherein providing the accumulating regional metric map further comprises:

providing the accumulating regional metric map to the provider device while the provider device is in an offline mode; and wherein determining the first accumulating regional metric for the provider device comprises determining that the provider device is online.

7. The method as recited in claim 1, wherein providing the accumulating regional metric map further comprises:

determining an accumulating cluster metric for a subset of a plurality of regions comprising the first region and the second region utilizing a clustering model based on accumulating regional metrics for the plurality of regions during a time period; and providing an accumulating cluster pin for the subset of the plurality of regions with the accumulating cluster metric within the accumulating regional metric map.

8. The method as recited in claim 7, wherein providing the accumulating regional metric map further comprises:

determining that a size or a shape of the subset of the plurality of regions does not meet a threshold size or a threshold shape;

recursively dividing the subset of the plurality of regions into a plurality of subdivisions until a particular subdivision of the plurality of subdivisions meets the threshold size or the threshold shape; and providing subdivision accumulating metric pins for the plurality of subdivisions within the accumulating regional metric map.

9. The method as recited in claim 7, wherein providing the accumulating regional metric map further comprises:

determining that a centroid of the subset of the plurality of regions is located outside a boundary of the subset of the plurality of regions; and placing, within the boundary of the subset of the plurality of regions, the accumulating cluster pin at a position based on distances from edges of the subset of the plurality of regions.

10. A system comprising:

at least one processor; and a non-transitory computer readable storage medium comprising instructions that, when executed by the at least one processor, cause the system to:

provide, for display via an interface of a provider device, an accumulating regional metric map displaying:

a first region having a first accumulating metric pin comprising a value of a first accumulating regional metric that the provider device can attain by entering the first region, and a second region having a second accumulating metric pin comprising a value of a second accumulating regional metric that the provider device can attain by entering the second region, wherein the second region is different from the first region and does not overlap with the first region; plurality of regions and a plurality monitor movement of the provider device to the first region of;

determine the first accumulating regional metric corresponding to the first accumulating metric pin of the first region for the provider device in response to monitoring the movement of the provider device to the first region;

monitoring movement of the provider device from the first region to an area outside the first region and the second region; and based on generating a transportation match between the provider device and a requester device located in the area outside the first region and the second region, provide a transportation match notification to the provider device for the transportation match that comprises the first accumulating regional metric corresponding to the first accumulating metric pin of the first region.

11. The system as recited in claim 10, further comprising instructions that, when executed by the at least one processor, cause the system to determine the first accumulating regional metric for the provider device by:

generating a cumulative events metric for the first region based on a plurality of transportation requests within the first region for a time period; and determining the first accumulating regional metric for the provider device based on the cumulative events metric for the first region.

12. The system as recited in claim 11, further comprising instructions that, when executed by the at least one processor, cause the system to determine the first accumulating regional metric for the provider device by:

generating additional cumulative events metrics for additional regions within a proximity of the first region; and determining the first accumulating regional metric for the provider device based further on the additional cumulative events metrics for the additional regions according to a geospatial smoothing model.

13. The system as recited in claim 11, further comprising instructions that, when executed by the at least one processor, cause the system to provide the accumulating regional metric map by:

generating the first accumulating metric pin corresponding to the first region and an additional region adjacent to the first region based on the cumulative events metric for the first region and an additional cumulative events metric for the additional region; and determining a placement location for the first accumulating metric pin based on a size and a position of a combined region comprising the first region and the additional region.

14. The system as recited in claim 13, further comprising instructions that, when executed by the at least one processor, cause the system to determine the placement location for the first accumulating metric pin by:

determining that a centroid of the combined region is outside a boundary of the combined region;

determining a pole of inaccessibility based on distances from edges of the combined region within the boundary of the combined region; and determining the placement location for the first accumulating metric pin at the pole of inaccessibility.

15. The system as recited in claim 10, further comprising instructions that, when executed by the at least one processor, cause the system to determine the first accumulating regional metric for the provider device by:

determining that the provider device moves to an additional region different from the first region and the second region;

determining that the first accumulating regional metric corresponding to the first accumulating metric pin of the first region is greater than an additional accumulating regional metric corresponding to an additional accumulating regional metric pin of the additional region; and selecting the first accumulating regional metric corresponding to the first accumulating metric pin of the first region for the provider device.

16. The system as recited in claim 10, further comprising instructions that, when executed by the at least one processor, cause the system to:

generate the transportation match for the provider device involving a transportation request associated with the requester device after determining the first accumulating regional metric for the provider device; and modify a transportation provider metric associated with the transportation request based on the first accumulating regional metric.

17. A non-transitory computer readable storage medium comprising instructions that, when executed by at least one processor, cause a computing device to:

provide, for display via an interface of a provider device, an accumulating regional metric map displaying:

a first region having a first accumulating metric pin comprising a value of a first accumulating regional metric that the provider device can attain by entering the first region, and a second region having a second accumulating metric pin comprising a value of a second accumulating regional metric that the provider device can attain by entering the second region, wherein the second region is different from the first region and does not overlap with the first region;

monitor movement of the provider device to the first region;

determine the first accumulating regional metric corresponding to the first accumulating metric pin of the first region for the provider device in response to monitoring the movement of the provider device to the first region;

monitoring movement of the provider device from the first region to an area outside the first region and the second region; and based on generating a transportation match between the provider device and a requester device located in the area outside the first region and the second region, provide a transportation match notification to the provider device for the transportation match that comprises the first accumulating regional metric corresponding to the first accumulating metric pin of the first region.

18. The non-transitory computer readable storage medium as recited in claim 17, further comprising instructions that, when executed by the at least one processor, cause the computing device to determine the first accumulating regional metric for the provider device by:

determining locations of a plurality of transportation requests within the first region for a time period;

generating a cumulative events metric for the first region during the time period based on the locations of the plurality of transportation requests;

generating estimated request conversion scores for the plurality of transportation requests during the time period; and determining the first accumulating regional metric for the provider device based on the cumulative events metric for the first region and the estimated request conversion scores.

19. The non-transitory computer readable storage medium as recited in claim 18, further comprising instructions that, when executed by the at least one processor, cause the computing device to determine the first accumulating regional metric for the provider device by utilizing a geospatial smoothing model to determine a contribution of a plurality of cumulative events metrics for a plurality of adjacent regions based on relative predicted conversion probabilities of a set of transportation requests in the plurality of adjacent regions.

20. The non-transitory computer readable storage medium as recited in claim 17, further comprising instructions that, when executed by the at least one processor, cause the computing device to provide the accumulating regional metric map by determining a placement location for an additional accumulating metric pin based on a size or a shape of a combined region for a subset of regions of a plurality of regions comprising the first region and the second region.

* * * * *